United States Patent
Kazama

(10) Patent No.: US 8,349,228 B2
(45) Date of Patent: Jan. 8, 2013

(54) METHOD OF MANUFACTURING CELLULOSE FILM, MANUFACTURING APPARATUS, OPTICAL FILM, POLARIZING PLATE AND LIQUID CRYSTAL DISPLAY

(75) Inventor: Kenichi Kazama, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 471 days.

(21) Appl. No.: 11/614,210

(22) Filed: Dec. 21, 2006

(65) Prior Publication Data

US 2007/0148371 A1 Jun. 28, 2007

(30) Foreign Application Priority Data

Dec. 26, 2005 (JP) .................................. 2005-373376

(51) Int. Cl.
 *B29D 7/01* (2006.01)
(52) U.S. Cl. .................. 264/1.6; 264/210.2; 264/211.12; 264/217; 264/175; 264/237; 264/284; 425/194; 425/373; 425/471
(58) Field of Classification Search .................. 264/175, 264/176.1, 210.1, 210.2, 211.12, 212, 217, 264/237, 280, 284, 1.6; 425/193, 194, 367, 425/373, 363, 327, 366, 362, 470, 471; 428/409
See application file for complete search history.

(56) References Cited

U.S. PATENT DOCUMENTS

| | | | | |
|---|---|---|---|---|
| 2,821,746 A | * | 2/1958 | Bicher, Jr. | 264/177.17 |
| 4,243,619 A | * | 1/1981 | Fraser et al. | 264/40.6 |
| 4,267,146 A | * | 5/1981 | Kurtz et al. | 264/564 |
| 4,360,494 A | * | 11/1982 | Kurtz | 264/564 |
| 4,515,647 A | * | 5/1985 | Behr | 156/91 |
| 4,808,359 A | * | 2/1989 | van der Molen | 264/173.19 |
| 5,045,264 A | * | 9/1991 | Kirksey | 264/173.16 |
| 5,075,060 A | * | 12/1991 | Imataki | 264/167 |
| 5,219,510 A | * | 6/1993 | Machell et al. | 264/210.6 |
| 5,468,440 A | * | 11/1995 | McAlpin et al. | 264/291 |
| 5,638,891 A | * | 6/1997 | Fukase et al. | 164/448 |
| 5,814,258 A | * | 9/1998 | Ogawa et al. | 264/173.12 |

(Continued)

FOREIGN PATENT DOCUMENTS

EP 899081 A1 * 3/1999

(Continued)

OTHER PUBLICATIONS

Glass transition of polymer resin.*
Glass transition of cellulose acetate (ester).*
Translation of JP 06-195757; JP 11-235747; and JP 2002-36333.*
Translation of JP 2002-292660.*

(Continued)

*Primary Examiner* — Dimple Bodawala
(74) *Attorney, Agent, or Firm* — Lucas & Mercanti, LLP

(57) ABSTRACT

An optical film characterized by a high degree of flatness that can be used as a phase difference film of a liquid crystal display, and a method for manufacturing this optical film according to melt-casting film forming method. A melt including a cellulose resin is extruded onto a rotary support member 5 (cooling roll) from a flow casting die 4. A rotary pinch member 6 (touch roll) is energized to the rotary support member 5, and a nip is formed between them. When the melt is sandwiched and pressed by the nip, a die line and irregularity in thickness are removed. The linear pressure of the rotary pinch member 6 and the temperature of the melt immediately before the melt is sandwiched and pressed by the nip are set within a predetermined range, whereby effective correction of the film flatness is achieved.

10 Claims, 6 Drawing Sheets

U.S. PATENT DOCUMENTS

| | | | |
|---|---|---|---|
| 5,887,644 A * | 3/1999 | Akiyoshi et al. | 164/428 |
| 5,996,680 A * | 12/1999 | Fukase et al. | 164/428 |
| 6,203,742 B1 * | 3/2001 | Kegasawa et al. | 264/173.16 |
| 6,461,138 B2 * | 10/2002 | Kegasawa et al. | 425/133.5 |
| 7,060,214 B2 * | 6/2006 | Katai et al. | 264/212 |
| 7,442,331 B2 * | 10/2008 | Nakamura | 264/40.1 |
| 7,678,300 B2 * | 3/2010 | Sugitani | 264/1.6 |
| 7,803,292 B2 * | 9/2010 | Heki | 264/1.6 |
| 7,854,864 B2 * | 12/2010 | Sato et al. | 264/1.6 |
| 2003/0170482 A1 * | 9/2003 | Murakami | 428/615 |
| 2003/0173703 A1 * | 9/2003 | yamazaki et al. | 264/216 |
| 2004/0155378 A1 * | 8/2004 | Kazama et al. | 264/211.1 |
| 2004/0173920 A1 * | 9/2004 | Erickson et al. | 264/1.6 |
| 2005/0110186 A1 * | 5/2005 | Tsujimoto | 264/216 |
| 2005/0150426 A1 | 7/2005 | Hashimoto et al. | |
| 2005/0161840 A1 * | 7/2005 | Stover et al. | 264/1.7 |
| 2005/0266178 A1 * | 12/2005 | Shimizu | 428/1.31 |
| 2006/0040047 A1 * | 2/2006 | Lee et al. | 427/162 |
| 2006/0214319 A1 * | 9/2006 | Kazama | 264/1.34 |
| 2007/0145615 A1 * | 6/2007 | Heki | 264/1.34 |

FOREIGN PATENT DOCUMENTS

| | | | |
|---|---|---|---|
| JP | 60-210418 A | * | 10/1985 |
| JP | 07213970 A | * | 8/1995 |
| JP | 10010321 | | 1/1998 |
| JP | 10264238 A | * | 10/1998 |
| JP | 11235747 A | * | 8/1999 |
| JP | 11314263 | | 11/1999 |
| JP | 2002036332 | | 2/2002 |
| JP | 2002036333 A | * | 2/2002 |
| JP | 2002212312 | | 7/2002 |
| JP | 2002292660 A | * | 10/2002 |
| JP | 2004-174743 | | 6/2004 |
| JP | 2004216717 | | 8/2004 |
| JP | 2005007808 A | * | 1/2005 |
| JP | 2005178194 | | 7/2005 |

OTHER PUBLICATIONS

Translation of JP 2002-36333.*

Translation of JP 2005-7808.*

* cited by examiner

METHOD OF MANUFACTURING CELLULOSE FILM, MANUFACTURING APPARATUS, OPTICAL FILM, POLARIZING PLATE AND LIQUID CRYSTAL DISPLAY This application is based on Japanese Patent Application No. 2005-373376 filed on Dec. 26, 2005, in Japanese Patent Office, the entire content of which is hereby incorporated by reference.

TECHNICAL FIELD

The present invention relates to a method of manufacturing a cellulose film, and manufacturing apparatus. It also related to an optical film manufactured by this manufacturing apparatus, particularly to an optical film preferably employed as the film of various functions used in a liquid crystal display. It further relates to a polarizing plate and liquid crystal display using this optical film.

BACKGROUND

The liquid crystal display uses various types of optical films such as a polarizing film and phase difference film. For example, the polarizing film of the polarizing plate used in the liquid crystal display is formed by laminating the optical film made of a cellulose film on one side or both sides of the polarizer made up of an oriented polyvinyl alcohol film as a protective film. Further, the phase difference film is used to increase viewing angle and to improve the contrast. Such a phase difference film includes the film provided with retardation by orienting the film such as cellulose ester film to provide retardation, and the film produced by coating a liquid crystal layer on a transparent substrate. It is also called an optical compensation film in some cases.

These optical films are required to be free of an optical defect and to have uniform retardation. The quality requirements are getting more and more severe, particularly due to the trend toward upsizing of the monitor and television set and improving degree of definition.

The optical film manufacturing method can be broadly classified into two types; a solution-casting film forming method and melt-casting film forming method. In the solution-casting film forming method, polymer is dissolved in a solvent and the solution is cast over the support member. Then the solvent is evaporated and, if required, the polymer is oriented to form a film. This film has been used over the wide range because of uniform film thickness and other advantages. In the melt-casting film forming method, polymer is heated and melted, and is cast over the support member where the polymer is cooled and solidified. If required, the polymer is further oriented to form a film. This melt-casting film forming method is not required to dry the solvent, and offers an advantage of using comparatively compact equipment.

The technique of manufacturing an optical film according to the melt-casting film forming method is disclosed, for example, in the following Japanese Laid-Open Patent Publication H10-10321 and the Japanese Laid-Open Patent Publication No. 2002-212312. The Japanese Laid-Open Patent Publication No. H10-10321 proposes a method of cooling the melted resin sandwiched between the cooling roll with the temperature kept at uniform level across the width and the endless belt in the form of a circular arc. The Japanese Laid-Open Patent Publication No. 2002-212312 proposes a method of cooling the melted resin by sandwiching between two cooling drums.

However, the melt from heating and melting the cellulose resin has a higher degree of viscosity than the solution from dissolving the cellulose resin in a solvent. The film produced according to the melt-casting film forming method is inferior in flatness to the film produced according to the solution-casting film forming method. To put it more specifically, this technique has the disadvantage that the die line and uneven thickness tends to occur easily.

SUMMARY

An object of the present invention is to solve the aforementioned problems and to provide an optical film of excellent retardation uniformity by forming a film using the cellulose resin according to the melt-casting method, as well as the method and apparatus for manufacturing the film. In view of forgoing, one embodiment according to one aspect of the present invention is a cellulose film manufacturing apparatus, comprising:

a flow casting die for extruding melted material including cellulose resin in a sheet-like shape;

a rotary support member for supporting, while rotating, the sheet-like melted material extruded from the flow cast die, in order of extrusion, on a surface thereof; and a rotary pinch member for forming a film of the melted material by pinching by a nip portion which is formed between the rotary support member and the rotary pinch member energized thereto, the rotary pinch member including a roller covered with a flexible metal sleeve whose thickness is not less than 0.1 mm and not more than 1.5 mm or a roller provided with a metal outer cylinder whose thickness is not less than 0.008 times and not more than 0.05 times of a radius of the roller, wherein a force F, with which the rotary pinch member is energized to the rotary support member, divided by a width W of the film at the nip portion is not less than 1 kN/m and not more than 15 kN/m, and a temperature T of the melded material just before being pinched by the nip portion and a glass transition temperature Tg of the cellulose resin satisfy the following relationship:

$$Tg < T < Tg + 110° C.$$

According to another aspect of the present invention, another embodiment is an optical film manufactured by a cellulose film manufacturing apparatus, the manufacturing apparatus comprising:

a flow casting die for extruding melted material including cellulose resin in a sheet-like shape;

a rotary support member for supporting, while rotating, the sheet-like melted material extruded from the flow cast die, in order of extrusion, on a surface thereof; and a rotary pinch member for forming a film of the melted material by pinching by a nip portion which is formed between the rotary support member and the rotary pinch member energized thereto, the rotary pinch member including a roller covered with a flexible metal sleeve whose thickness is not less than 0.1 mm and not more than 1.5 mm or a roller provided with a metal outer cylinder whose thickness is not less than 0.008 times and not more than 0.05 times of a radius of the roller, wherein a force F, with which the rotary pinch member is energized to the rotary support member, divided by a width W of the film at the nip portion is not less than 1 kN/m and not more than 15 kN/m, and a temperature T of the melded material just before being pinched by the nip portion and a glass transition temperature Tg of the cellulose resin satisfy the following relationship:

$$Tg < T < Tg + 110° C.$$

According to another aspect of the present invention, another embodiment is a polarizing plate which comprises, as a protection film, an optical film manufactured by a cellulose film manufacturing apparatus, the manufacturing apparatus including:

a flow casting die for extruding melted material including cellulose resin in a sheet-like shape;

a rotary support member for supporting, while rotating, the sheet-like melted material extruded from the flow cast die, in order of extrusion, on a surface thereof; and a rotary pinch member for forming a film of the melted material by pinching by a nip portion which is formed between the rotary support member and the rotary pinch member energized thereto, the rotary pinch member including a roller covered with a flexible metal sleeve whose thickness is not less than 0.1 mm and not more than 1.5 mm or a roller provided with a metal outer cylinder whose thickness is not less than 0.008 times and not more than 0.05 times of a radius of the roller, wherein a force F, with which the rotary pinch member is energized to the rotary support member, divided by a width W of the film at the nip portion is not less than 1 kN/m and not more than 15 kN/m, and a temperature T of the melted material just before being pinched by the nip portion and a glass transition temperature Tg of the cellulose resin satisfy the following relationship:

$$Tg<T<Tg+110° C.$$

According to another aspect of the present invention, another embodiment is an liquid crystal display which comprises a polarizing plate including, as a protection film, an optical film manufactured by a cellulose film manufacturing apparatus, the manufacturing apparatus having:

a flow casting die for extruding melted material including cellulose resin in a sheet-like shape;

a rotary support member for supporting, while rotating, the sheet-like melted material extruded from the flow cast die, in order of extrusion, on a surface thereof; and a rotary pinch member for forming a film of the melted material by pinching by a nip portion which is formed between the rotary support member and the rotary pinch member energized thereto, the rotary pinch member including a roller covered with a flexible metal sleeve whose thickness is not less than 0.1 mm and not more than 1.5 mm or a roller provided with a metal outer cylinder whose thickness is not less than 0.008 times and not more than 0.05 times of a radius of the roller, wherein a force F, with which the rotary pinch member is energized to the rotary support member, divided by a width W of the film at the nip portion is not less than 1 kN/m and not more than 15 kN/m, and a temperature T of the melted material just before being pinched by the nip portion and a glass transition temperature Tg of the cellulose resin satisfy the following relationship:

$$Tg<T<Tg+110° C.$$

According to another aspect of the present invention, another embodiment is a method for manufacturing a cellulose film, the method comprising the steps of:

extruding melted material including cellulose resin, in a sheet-like shape, out of the flow casting die;

supporting the melted material extruded from the flow casting die, in order of extrusion, on a surface of a rotary pinch member while rotating the rotary pinch member; and forming a film out of the melted material by pinching the melted material at a nip portion which is formed between the rotary support member and the rotary pinch member energized thereto, wherein a force F, with which the rotary pinch member is energized to the rotary support member, divided by a width W of the film at the nip portion is not less than 1 kN/m and not more than 15 kN/m, the rotary pinch member includes a roller covered with a flexible metal sleeve whose thickness is not less than 0.1 mm and not more than 1.5 mm or a roller provided with a metal outer cylinder whose thickness is not less than 0.008 times and not more than 0.05 times of a radius of the roller, the metal sleeve is energized to the rotary support member, and the rotary pinch member pinches the melted material when a temperature T of the melded material just before being pinched by the nip portion and a glass transition temperature Tg of the cellulose resin satisfy the following relationship:

$$Tg<T<Tg+110° C.$$

BRIEF DESCRIPTION OF THE DRAWINGS

FIG. 3(*b*) is a cross sectional view of the major portions of the flow casting die;

DETAILED DESCRIPTION OF THE PREFERRED EMBODIMENT

Figure 8:
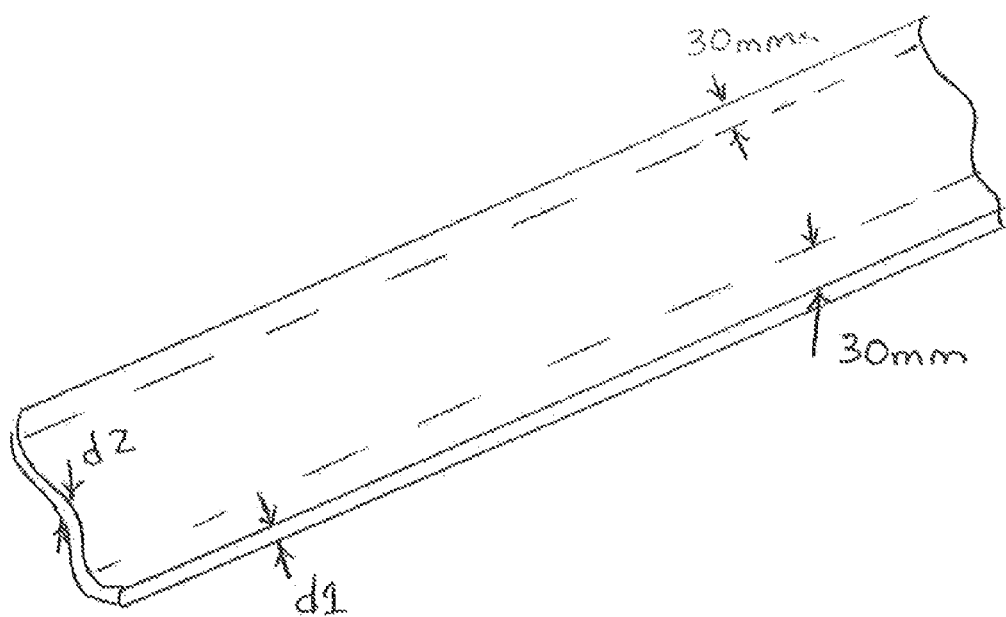
FIG. 8 illustrates the optical films and the location for measuring d1 and d2.

The cellulose film manufacturing apparatus can have an average thickness d1 of an edge area within 30 mm from an edge of the sheet-like melted material with respect to a width direction perpendicular to a rotating direction of the rotary support member and an average thickness d2 of an inner part than the edge area satisfy the following relationship: d1<d2, see FIG. 8.

The cellulose film manufacturing apparatus can have an interior portion of the metal sleeve is filled with fluid.

The cellulose film manufacturing apparatus can have the roller covered with the metal sleeve includes an elastic roll, and the metal sleeve is pressed against the rotary support member by the elastic roll.

The cellulose film manufacturing apparatus can have the elastic roll constituted with an inner metal cylinder rotatably supported and provided with rubber on a surface thereof.

The cellulose film manufacturing apparatus can have the metal outer cylinder with a space therein and is mounted on a pair of flanges which are disposed on an axis of rotation.

The cellulose film manufacturing apparatus can have a passage of fluid is provided in the space.

The cellulose film manufacturing apparatus can have the force F, with which the rotary pinch member is energized to the rotary support member, divided by the width W of the film at the nip portion is not less than 5 kN/m and not more than 10 kN/m.

Referring to drawings, the following describes the details of the best embodiment for embodying the present invention, without the present invention being restricted thereto.

The present invention relates to the optical film manufacturing method that can be used especially in the protective film for the polarizing plate of a liquid crystal display apparatus.

The optical film as an object of the present invention refers to a functional film used in various types of displays such as a liquid crystal display, plasma display and organic electroluminescent display—especially in a liquid crystal display. It includes a polarizing plate protective film, phase difference film, antireflection film, enhanced brightness film, and optical compensation film with enlarged viewing angle—especially a phase difference film.

The optical film manufacturing method as an embodiment of the present invention is based on the melt-casting film forming method. In the melt-casting film forming method, the film constituent material is heated. When the material has been fluidized, the aforementioned material is melt-extruded on a rotary support member (e.g., cooling roll, cooling drum or endless belt), whereby a film is formed.

When a film is formed by the melt-casting film forming method, the presence of volatile components in the cast material will adversely affect the flatness and transparency of the film which is to be utilized as an optical film. This is because entry of volatile components in the produced film will reduce the transparency, and will cause a streak (die line) to appear on the film surface when a film is formed through extrusion from a die-slit, with the result that the flatness may deteriorate. For this reason, when a film constituent material is processed to form a film, for the purpose of avoiding generation of volatile components at the time of heating and melting, it is preferred to eliminate the presence of the component that volatilizes in the range of temperature lower than the melting temperature in film formation.

The volatile component includes the moisture absorbed by the film constituting material and the solvent mixed before purchase of the film constituting material or at the time of synthesis. Volatilization is caused by the evaporation, sublimation or decomposition resulting from heating of these components.

The material constituting the optical film as an embodiment of the present invention includes the cellulose resin. If required, a stabilizer and plasticizer are also included. An ultraviolet absorber, a matting agent as a lubricant and retardation inhibitor can also be included if further required. These materials are selected according to the required characteristics of the optical film.

The cellulose resin constituting the optical film in the embodiment of the present invention has the structure of a cellulose ester. It is amorphous and is independent or mixed acid ester of cellulose including the structure of at least any one of the aliphatic acyl group and substituted and unsubstituted aromatic acyl groups. The term "amorphous" refers to the state of a solid substance in irregular molecule arrangement without being crystallized. It represents the status of crystallization in the form of a raw material.

The following illustrates an example of the cellulose resin preferably used in the embodiment of the present invention, without the present invention being restricted thereto:

When the cellulose resin includes an aromatic acyl group and the aromatic ring is a benzene ring, the substituent of the benzene ring is exemplified by a halogen atom, cyano, alkyl group, alkoxy group, aryl group, aryloxy group, acyl group, carbonamide group, sulfonamide group, ureido group, aralkyl group, nitro, alkoxy carbonyl group, aryloxy carbonyl group, aralkyloxy carbonyl group, carbamoyl group, sulfamoyl group, acyloxy group, alkenyl group, alkynyl group, alkylsulfonyl group, arylsulfonyl group, alkyloxy sulfonyl group, aryloxy sulfonyl group, alkylsulfonyloxy group and aryloxysulfonyl group, —S—R, —NH—CO—OR, —PH—R, —P(—R)$_2$, —PH—O—R, —P(—R) (—O—R), —P(—O—R)$_2$, —PH(=O)—R—P(=O) (—R)$_2$, —PH(=O)—O—R, —P(=O) (—R) (—O—R), —P(=O) (—O—R)$_2$, —O—PH(=O)—R, —O—P(=O) (—R)$_2$—O—PH(=O)—O—R, —O—P(=O) (—R) (—O—R), —O—P(=O) (—O—R)$_2$, —NH—PH(=O)—R, —NH—P(=O) (—R) (—O—R), —NH—P(=O) (—O—R)$_2$, —SiH$_2$—R, —SiH(—R)$_2$, —Si(—R)$_3$, —O—SiH$_2$—R, —O—SiH(—R)$_2$ and —O—Si(—R)$_3$. The aforementioned R is an aliphatic group, aromatic group or heterocyclic group.

The number of the substituents is 1 through 5, preferably 1 through 4, more preferably 1 through 3, still more preferably 1 or 2. When the number of the substituents to replace the aromatic ring is two or more, they can be the same or different from one another, but they can be combined to form a condensed polycyclic compound (e.g., naphthalene indene, indan, phenanthrene, quinoline, isoquinoline, chromene, chromane, phthalazine, acridine, indole and indoline).

Halogen atom, cyano, alkyl group, alkoxy group, aryl group, aryloxy group, acyl group, carbonamide group, sulfone amide group and ureido group are preferably used as the substituent. Halogen atom, cyano, alkyl group, alkoxy group, aryloxy group, acyl group and carbonamide group are more preferably used. The halogen atom, cyano, alkyl group, alkoxy group and aryloxy group are still more preferably used, and the halogen atom, alkyl group and alkoxy group are most preferably used.

The aforementioned halogen atom includes a fluorine atom, chlorine atom, bromine atom and iodine atom. The aforementioned alkyl group may be either cyclic or branched. The alkyl group contains preferably 1 through 20 carbon atoms, more preferably 1 through 12, still more preferably 1 through 6, most preferably 1 through 4.

The aforementioned alkyl group is exemplified by methyl, ethyl, propyl, isopropyl, butyl, t-butyl, hexyl, cyclo hexyl, octyl and 2-ethylhexyl.

The aforementioned alkoxy group may be either cyclic or branched. The alkoxy group contains preferably 1 through 20 carbon atoms, more preferably 1 through 12, still more preferably 1 through 6, most preferably 1 through 4. The alkoxy group may be replaced by still another alkoxy group. The alkoxy group is exemplified by methoxy, ethoxy, 2-methoxyethoxy, 2-methoxy-2-ethoxyethoxy, butyloxy, hexyloxy and octyloxy.

The aforementioned aryl group contains preferably 6 through 20 carbon atoms, more preferably 6 through 12. The aryl group is exemplified by phenyl and naphthyl. The aforementioned aryloxy group contains preferably 6 through 20 carbon atoms, more preferably 6 through 12.

The aforementioned aryloxy group is exemplified by phenoxy and naphtoxy. The acyl group contains preferably 1 through 20 carbon atoms, more preferably 1 through 12.

The aforementioned acyl group is exemplified by formyl, acetyl and benzoyl. The aforementioned carbonamide group contains preferably 1 through 20 carbon atoms, more preferably 1 through 12.

The aforementioned carbonamide group is exemplified by acetoamide and benzamide. The aforementioned sulfone amide group contains preferably 1 through 20 carbon atoms, more preferably 1 through 12.

The aforementioned sulfone amide group is exemplified by methane sulfone amide, benzene sulfone amide and p-toluene sulfone amide. The aforementioned ureido group contains preferably 1 through 20 carbon atoms, more preferably 1 through 12.

The aforementioned ureido group is exemplified by (unsubstituted) ureido.

The aforementioned aralkyl group contains preferably 7 through 20 carbon atoms, more preferably 7 through 12. The aralkyl group is exemplified by benzyl, phenethyl and naphthylmethyl.

The aforementioned alkoxy carbonyl group contains preferably 1 through 20 carbon atoms, more preferably 2 through 12. The alkoxy carbonyl group is exemplified by methoxy carbonyl.

The aforementioned aryloxy carbonyl group contains preferably 7 through 20 carbon atoms, more preferably 7 through 12. The aryloxy carbonyl group is exemplified by phenoxy carbonyl.

The aforementioned aralkyloxy carbonyl group contains preferably 8 through 20 carbon atoms, more preferably 8 through 12. The aralkyloxy carbonyl group is exemplified by benzyloxy carbonyl.

The aforementioned carbamoyl group contains preferably 1 through 20 carbon atoms, more preferably 1 through 12. The carbamoyl group is exemplified by (unsubstituted) carbamoyl and N-methylcarbamoyl.

The aforementioned sulfamoyl group contains preferably 20 or less carbons, more preferably 12 or less carbons. The sulfamoyl group is exemplified by (unsubstituted) sulfamoyl and N-methylsulfamoyl. The aforementioned acyloxy group contains preferably 1 through 20 carbon atoms, more preferably 2 through 12.

The aforementioned acyloxy group is exemplified by acetoxy and benzoyloxy.

The aforementioned alkenyl group contains preferably 2 through 20 carbon atoms, more preferably 2 through 12. The alkenyl group is exemplified by vinyl, alkyl and isopropenyl.

The aforementioned alkynyl group contains preferably 2 through 20 carbon atoms, more preferably 2 through 12. The alkynyl group is exemplified by thienyl.

The aforementioned alkyl sulfonyl group contains preferably 1 through 20 carbon atoms, more preferably 1 through 12.

The aforementioned aryl sulfonyl group contains preferably 6 through 20 carbon atoms, more preferably 6 through 12.

The aforementioned alkyloxy sulfonyl group contains preferably 1 through 20 carbon atoms, more preferably 1 through 12.

The aforementioned aryloxy sulfonyl group contains preferably 6 through 20 carbon atoms, more preferably 6 through 12.

The aforementioned alkylsulfonyloxy group contains preferably 1 through 20 carbon atoms, more preferably 1 through 12.

The aforementioned aryloxysulfonyl group contains preferably 6 through 20 carbon atoms, more preferably 6 through 12.

In the cellulose resin used in the embodiment of the present invention, when the hydrogen atom of the hydroxyl group of cellulose is a fatty acid ester aliphatic acyl group, the examples include aliphatic acyl group containing 2 through 20 carbon atoms. To put it more specifically, examples are acetyl, propionyl, butyryl, isobutyryl, valeryl, pivaloyl, hexanoyl, octanoyl, lauroyl and stearoyl.

In the embodiment of the present invention, the aforementioned aliphatic acyl group includes the group containing a further substituent. The substituent can be exemplified by those mentioned as substituents of the benzene ring when the aromatic ring is a benzene ring in the aforementioned aromatic acyl group.

When a phase difference film is to be manufactured as the optical film, at least one substance selected from among the cellulose acetate, cellulose propyonate, cellulose butylate, cellulose acetate propyonate, cellulose acetate butylate, cellulose acetate phthalate, and cellulose phthalate is preferably used as the cellulose resin. Alternatively, the preferably used one is the biodegradable cellulose derivative hybrid graft polymerizer formed by ring opening hybrid graft polymerization between lactone and lactide by addition of a ring opening polymerization catalyst of cyclic ester in the presence of the cellulose derivative described in Japanese Patent No. 3715100. Especially the lactone is preferably the one selected from among the groups made up of β-propiolactone, δ-valerolactone, ε-caprolactone, α,α-dimethyl-β-propiolactone, β-ethyl-δ-valerolactone, α-methyl-ε-caprolactone, β-methyl-ε-caprolactone, γ-methyl-ε-caprolactone and 3,3,5-trimethyl-ε-caprolactone. The cellulose derivative is exemplified by cellulose ester such as cellulose diacelate, cellulose acetate butylate, cellulose acetate propyonate, cellulose acetate phthalate and cellulose nitrate, or cellulose ether such as ethylcellulose, methylcellulose, hydroxypropylcellulose and hydroxypropylmethylcellulose. They can be produced according to the method disclosed in Japanese Patent No. 3715100.

In these substances, the particularly preferred cellulose resin is exemplified by cellulose acetate, cellulose propyonate, cellulose butylate, cellulose acetate propyonate and cellulose acetate butylate.

The cellulose acetate propyonate as fatty acid ester and cellulose acetate butylate have an acyl group containing 2 through 4 carbon atoms as a substituent. Assume that the acetyl group has a replacement ratio of X, and the propionyl group or butyryl group has a replacement ratio of Y. In this case, both the following relationships (I) and (II) are preferably met at the same time. The replacement ratio is defined as the numerical value wherein the number of the hydroxyl groups replaced by the acyl group is represented in terms of glucose unit.

$$2.6 \leq X+Y \leq 3.0 \qquad \text{Relationship (I)}$$

$$0 \leq X \leq 2.5 \qquad \text{Relationship (II)}$$

Particularly the cellulose acetate propyonate is preferably used. In this case, $1.9 \leq X \leq 2.5$ and $0.1 \leq Y \leq 0.9$ are preferred. The portion not replaced by the aforementioned acyl group is normally present as a hydroxyl group. They can be synthesized by a known method.

The cellulose material of the cellulose resin used in the embodiment of the present invention can be a wood pulp or cotton linter. The wood pulp can be a conifer or a broadleaved tree. The conifer is more preferred. From the view-point of separability at the time of film formation, use of the cotton linter is more preferred. The cellulose resins produced therefrom can be used in a mixed form or independently.

Uniform mixing of the constituent material other than the cellulose resin of the film constituting material with the aforementioned resin effectively provides uniform melting at the time of heating.

Polymer material and oligomer other than the cellulose resin can be selected as appropriate, and can be mixed with the cellulose resin. Such a polymer material and oligomer are preferred to have a high degree of compatibility with the cellulose resin. The transmittance is 80% or more over the entire visible range (400 nm through 800 nm) when a film is formed, preferably 90% or more, more preferably 92% or more. The purpose of mixing at least one of the polymer material and oligomer other than the cellulose resin is to improve the controllability of viscosity at the time of heating and melting, and the physical properties of the film subsequent to film processing. The polymer material and oligomer can be interpreted as other additives.

At least one of the stabilizers should be added to the film constituting material before or at the time of heating and melting of the aforementioned cellulose resin. The stabilizer is required to function without being decomposed at the melting temperature for film formation.

The stabilizer includes a hindered phenol antioxidant, acid-acceptor, hindered amine light stabilizer, peroxide decomposer, radical acceptor, metal deactivator and amines. They are disclosed in the Japanese Laid-Open Patent Publication No. H03-199201, Japanese Laid-Open Patent Publication No. H05-1907073, Japanese Laid-Open Patent Publication No. H05-194789, Japanese Laid-Open Patent Publication No. H05-271471, and Japanese Laid-Open Patent Publication No. H06-107854.

The stabilizer is used to prevent oxidation of the film constituting material, to capture the acid produced by decomposition, to prevent or inhibit decomposition caused by radical species due to light or heat, and to check generation of volatile component caused by the degeneration represented by coloring or a reduction in molecular weight or material decomposition, including the decomposition reaction yet to be clarified. To be more specific, addition of stabilizer into the film constituting material is very effective in checking or preventing generation of the volatile component resulting from degeneration and decomposition of the film constituting material other than the stabilizer. Further, the stabilizer itself is required not to generate a volatile component in the range of temperature for melting the film constituting material.

In the meantime, if the film constituting material is heated and melted, the degree of decomposition is increased. This composition may reduce the strength of the aforementioned constituting material resulting from coloring or reduction in the molecular weight. Further, the decomposition of the film constituting material may be accompanied by production of volatile components.

To avoid degeneration and to reduce moisture absorbency of the film constituting material, the constituent materials can be divided into one or more types of pellet for storage. Pelletization improves the mixability and compatibility of melded material when heated, or allows the optical uniformity of the film to be ensured in some cases.

At the time of heating and melting the film constituting material, the presence of a stabilizer is preferred, because the stabilizer minimizes the reduction in strength caused by deterioration and decomposition of the material, or maintains the strength intrinsic to the material.

When the phase difference film is manufactured, addition of a stabilizer is preferred. In the step of providing retardation as a phase difference film in the production of a film, the stabilizer minimizes reduction in the deterioration of the strength of the aforementioned film constituting material, or maintains the strength inherent to the material. If the film constituting material is embrittled by considerable deterioration, breakage tends to occur in the step of orientation at the time of film formation. This is because retardation value as a phase difference film cannot be ensured in some cases.

Further, the presence of the stabilizer is important because it reduces generation of a colored object in the visible light area at the time of heating and melting, and reduces or removes the factors undesirable to the phase difference film such as transmittance or haze value caused by entry of the volatile component into the film. The haze value is less than 1%, preferably less than 0.5%.

In the film constituting material storage or film making process, deterioration may be caused by the presence of oxygen in the air. In this case, means can be provided to reduce the density of oxygen in the air, in addition to the method of using the stabilizing function of the stabilizer. Such means can be exemplified by the known technology of using the nitrogen or argon as an inert gas, deaeration under reduced pressure or under vacuum, and operation in an enclosed environment. At least one of these three methods can be used together with the method wherein the aforementioned stabilizer is present. When the probability of the film constituting material contacting the oxygen in the air is reduced, deterioration of the aforementioned material can be reduced.

When the phase difference film is used as a polarizing plate protective film, the aforementioned stabilizer should be incorporated in the film constituting material in order to improve the storage stability over time with respect to the polarizer constituting the polarizing plate and polarizing plate.

In the liquid crystal display apparatus using a polarizing plate, presence of the aforementioned stabilizer in the phase difference film improves the storage stability over time of the phase difference film and provides the optical compensation function for a long period of time.

A known compound can be used as the hindered phenol antioxidant compound contributing to stabilization at the time of heating and melting the film constituting material. It is exemplified by a 2,6-dialkyl phenol derivative compound including the compound disclosed in the 12th through 14th columns of the Specification in the U.S. Pat. No. 4,839,405. The hindered phenol based antioxidant compound is commercially available, for example, under the trade name of "Irganox 1076" and "Irganox 1010" manufactured by Ciba Specialty Chemicals K.K.

The epoxy compound described in the Specification of the U.S. Pat. No. 4,137,201 is preferably included as a acid-acceptor contributing to stabilization at the time of heating and melting the film constituting material. Such a compound is already known in the aforementioned technical field. It is exemplified by the diglycidyl ether of various polyglycols; polyglycol induced by condensation of about 8 through 40 moles of ethylene oxide per mole of polyglycol in particular; a metallic epoxy compound such as diglycidyl ether of glycerol (e.g. the compound having been used so far together with polyvinyl chloride polymer composition in the polyvinyl chloride polymer composition); epoxidized ether condensed product; diglycidyl ether of the bisphenol A (e.g., 4,4'-dihydroxydiphenyl dimethyl methane); epoxidized unsaturated fatty acid ester (particularly, the alkyl ester containing about 4 through 2 carbon atoms of the fatty acid of this carbon atom having about 2 through 22 (e.g., butyl epoxy stearate); and various epoxidized long chain fatty acid triglyceride (e.g., epoxidized plant oil and other unsaturated natural gas (sometimes called the epoxidized natural glyceride or unsaturated fatty acid wherein these fatty acid generally contain 12 through 22 carbon atoms)) represented and illustrated by the compound of epoxidized soy bean oil). Further examples of the acid-acceptor that can be used include the ones described in the paragraphs 87 through 105 of the Japanese Laid-Open Patent Publication No. H5-194788.

A known compound can be used as the hindered amine light stabilizer (HALS) contributing to the stabilization at the time of heating and melting of the film constituting material. To put it more specifically, it is exemplified by 2,2,6,6-tetraalkyl piperidine compound, the acid added salt thereof, or the complex between the same and metallic compound, as described in the 5th through 11th columns in the Specification of the U.S. Pat. No. 4,619,956 and in the 3rd through 5th columns in the Specification of the U.S. Pat. No. 4,839,405.

At least one of the stabilizer types can be selected and added. The amount to be added is preferably 0.001 or more percent by mass without exceeding 5 percent by mass with respect to the mass of cellulose resin, more preferably 0.005 or more percent by mass without exceeding 3 percent by mass, still more preferably 0.01 or more percent by mass without exceeding 0.8 percent by mass.

If the amount of the stabilizer to be added is insufficient, the advantages of the stabilizer cannot be used effectively due to a lower effect of stabilization at the time of heating and melting. If the amount of the stabilizer to be added is excessive on the other hand, film transparency will be reduced for the compatibility with resin, and the film will become brittle. This must be avoided.

The stabilizer is preferably mixed before melting the resin. A mixer may be used for this purpose, or mixing may be made in the cellulose resin preparation phase, as described above. It is also possible to make such arrangements that mixing is made at a temperature lower than the melting point of the resin and higher than that of the stabilizer, and only the stabilizer is melted and is adsorbed on the surface of resin.

Addition of the plasticizer is preferred for the purpose of improving the film quality such as improving mechanical properties, providing softness and water repellency, and reducing the moisture transmittance.

In the melt-casting film forming method practiced in the embodiment of the present invention, use of a plasticizer is intended to reduce the film constituting material melting temperature below than the glass transition temperature of the single cellulose resin to be used, or to reduce the viscosity of the film constituting material including the plasticizer below that of the single cellulose resin at the same heating temperature.

The film constituting material melting temperature in the embodiment of the present invention refers to the lowest temperature at which the heated material has flowability.

When only the cellulose resin is used and the temperature is lower than the glass transition temperature, the material is not fluidized to form a film. In the case of the aforementioned resin, however, the modulus of elasticity or viscosity is reduced by absorption of heat at the glass transition temperature or more, and the material is fluidized. To lower the film constituting material melting temperature, the plasticizer to be added preferably has a melting point or a glass transition temperature lower than the glass transition temperature of the cellulose resin.

For example, a phosphoric acid ester derivative and carboxylic acid ester derivative are preferably used as a plasticizer. It is also preferred to use the polymer obtained by polymerization of the ethylenic unsaturated monomer having a weight average molecular weight of 500 or more without exceeding 10,000 mentioned in the Japanese Laid-Open Patent Publication No. 2003-12859, the acryl based polymer, the acryl based polymer having an aromatic ring on the side chain, or acryl based polymer having the cyclohexyl group on the side chain.

The phosphoric acid ester derivative is exemplified by triphenyl phosphate, tricresyl phosphate and phenyldiphenylphosphate.

The carboxylic acid ester derivative is exemplified by phthalic acid ester and citric acid ester. The phthalic acid ester derivative is exemplified by dimethylphthalate, diethylphthalate, dicyclohexyl phthalate, dioctylphthalate and diethylhexylphthalate. The citric acid ester is exemplified by citric acid acetyl triethyl and citric acid acetyl tributyl.

Other substances preferably used for the aforementioned purpose are butyl oleate, methylacetyl ricinoleate, dibutyl sebacate, triacetin, trimethylol propane tribenzoate and others. Alkylphthalylalkylglycolate is also used for this purpose. The alkyl of the alkylphthalyl alkylglycolate is an alkyl group containing 1 through 8 carbon atoms. The alkylphthalyl alkylglycolate is exemplified by methylphthalyl methylglycolate, ethylphthalyl ethylglycolate, propylphthalyl propylglycolate, butylphthalyl butylglycolate, octylphthalyl octylglycolate, methylphthalyl ethylglycolate, ethylphthalylmethyl glycolate, ethylphthalylpropyl glycolate, propylphthalyl ethylglycolate, methylphthalyl propylglycolate, methylphthalyl butylglycolate, ethylphthalylbutyl glycolate, butylphthalyl methylglycolate, butylphthalyl ethylglycolate, propyl phthalyl butylglycolate, butylphthalyl propylglycolate, methylphthalyl octylglycolate, ethylphthalyloctyl glycolate, octylphthalyl methylglycolate and octylphthalyl ethylglycolate. Methylphthalyl methylglycolate, ethylphthalyl ethylglycolate, propylphthalyl propylglycolate, butylphthalyl butylglycolate and octylphthalyl octylglycolate are preferably used. In particular, ethylphthalyl ethylglycolate is preferably used. Further, two or more of the alkylphthalyl alkylglycolate and others can be mixed for use.

The amount of the plasticizer to be added is preferably 0.5 percent by mass or more through 20 percent by mass exclusive, with respect to the resin constituting the film constituting material, more preferably 1 percent by mass or more through 11 percent by mass exclusive.

The aforementioned plasticizer is preferred not to generate a volatile component at the time of heating and melting. To put it more specifically, the nonvolatile phosphoric acid ester described in the Japanese Translation of PCT International Application Publication No. H06-501040 can be mentioned as an example. The arylene bis(diaryl phosphate) ester and trimethylol propane tribenzoate as the above illustrated compound can be preferably used, without being restricted thereto. When the volatile component is subjected to the thermal decomposition of the plasticizer, the thermal decomposition temperature Td (1.0) of the plasticizer is defined as the temperature at the time of reduction by 1.0 percent by mass. This requires that the temperature is higher than the film constituting material melting temperature (Tm). This is because, in order to meet the purpose of addition, the amount of the plasticizer to be added to the cellulose resin is greater than that of other film constituting material, and the presence of the volatile component has a serious impact on the deterioration of the quality of the film to be obtained. It should be noted that thermal decomposition temperature Td (1.0) can be measured by the commercially available differential thermogravimetric analyzer (TG-DTA).

For the purpose of preventing the polarizer and display apparatus from being deteriorated by ultraviolet rays, the ultraviolet absorber is characterized by excellent function of absorbing the ultraviolet rays having a wavelength of 370 nm or less. Viewed from the liquid crystal display performance, the absorber is preferred to absorb a smaller amount of the visible light with a wavelength of 400 nm or more. The ultraviolet absorber is exemplified by an oxybenzophenone based compound, benzotriazole based compound, salicylic acid ester based compound, benzophenone based compound, cyanoacrylate based compound and nickel complex salt based compound. The benzophenone based compound and benzotriazole based compound of less coloring are preferably used. It is also possible to use the ultraviolet absorber mentioned in the Japanese Laid-Open Patent Publication No. H10-182621 and Japanese Laid-Open Patent Publication No. H08-337574 and the polymer ultraviolet absorber described in the Japanese Laid-Open Patent Publication No. H06-148430.

The benzotriazole based ultraviolet absorber is exemplified by mixtures of 2-(2'-hydroxy-5'-methylphenyl) benzotriazole, 2-(2'-hydroxy-3',5'-di-tert-butylphenyl) benzotriazole, 2-(2'-hydroxy-3'-tert-butyl-5'-methylphenyl) benzotriazole, 2-(2'-hydroxy-3',5'-di-tert-butylphenyl)-5-chlorobenzotriazole, 2-(2'-hydroxy-3'-(3",4",5",6"-tetrahydrophthalimide methyl)-5'-methylphenyl) benzotriazole, 2,2-methylene bis(4-(1,1,3,3-tetramethylbutyl)-6-(2H-benzotriazole-2-yl) phenol), 2-(2'-hydroxy-3'-tert-butyl-5'-methylphenyl)-5-chlorobenzotriazole, 2-(2H-benzotriazole-2-yl)-6-(straight chain and side chain dodecyl)-4-methylphenol, octyl-3-[3-tert-butyl-4-hydroxy-5-(chloro-2H-benzotriazole-2-yl) phenyl]propynoate and 2-ethylhexyl-3-[3-tert-butyl-4-hydroxy-5-(5-chloro-2H-benzotriazole-2-yl)phenyl]propynoate, without being restricted thereto.

TINUVIN 109, TINUVIN 171, TINUVIN 326 (by Ciba Specialty Chemicals K.K.) can be mentioned as a commercially available.

The benzophenone based compound can be exemplified by 2,4-dihydroxybenzophenone, 2,2'-dihydroxy-4-methoxybenzophenone, 2-hydroxy-4-methoxy-5-sulfobenzophenone, and bis (2-methoxy-4-hydroxy-5-benzoylphenyl methane), without being restricted thereto.

The amount of the ultraviolet absorber to be added is 0.1 through 20 percent by mass with respect to the mass of cellulose resin, preferably 0.5 through 10 percent by mass, more preferably 1 through 5 percent by mass. Two or more types thereof can be added in combination.

The optical film can be provided with a matting agent to improve sliding property, transportability and easy winding.

The matting agent is preferably made of particles as fine as possible. It is exemplified by inorganic particles and crosslinking polymer particles of silicon dioxide, titanium dioxide, aluminum oxide, zirconium oxide, calcium carbide, karyon, talc, sintered calcium silicate, hydrated calcium silicate, aluminum silicate, magnesium silicate and calcium phosphate.

Of the aforementioned substances, silicon dioxide reduces the degree of film haze, and is preferably used. The particles such as silicon dioxide are often surface-treated by an organic substance. They reduce the film haze and are preferably used.

The surface-treated organic substance preferably used is exemplified by halosilane, alkoxy silane, silazane and siloxane. When the average particle size of the particle is greater, the sliding property effect is greater. Conversely, when the average particle size of the particle is smaller, the transparency is superior. Further, the average size of the secondary particle is 0.05 through 1.0 μm. The average size of the secondary particle is preferably 5 through 50 nm, more preferably 7 through 14 nm. The aforementioned particle is preferably used to form projections and depressions having a height of 0.01 through 1.0 μm on the film surface. The amount of particles contained therein is preferably 0.005 through 0.3 percent by mass with respect to cellulose resin.

The particle of silicon dioxide is exemplified by AEROSIL 200, 200V, 300, R972, R972V, R974, R202, R812, OX50, and TT600 (by Nippon Aerosil Co., Ltd.). Of these, AEROSIL 200V, R972, R972V, R974, R202 and R812 are preferably used. Two or more of these particles can be used. When two or more of these particles are used, they can be mixed for use in any mixing ratio. In this case, the mass ratio of the particles having different average particle size and different materials, for example, the mass ratio of AEROSIL 200V and R972V is 0.1 to 99.9 through 99.9 to 0.1 is preferred for use.

The matting agent is preferably added before the film constituting material is melted, or is preferably included in the film constituting material in advance. For example, after the particles dispersed in a solvent in advance and other additives such as cellulose resin and/or plasticizer and ultraviolet absorber have been mixed and dispersed, the solvent is volatilized. Alternatively, the matting agent is included in the film constituting material in advance by precipitation method. Use of such a film constituting material provides uniform dispersion of the matting agent in the cellulose resin.

Another object of the particles in the film used as a matting agent is to improve the strength of the film as another object.

For example, when a phase difference film is manufactured as an optical film, the retardation inhibitor can be added to adjust the retardation. As described in the Specification of European Patent 911,656A2, the aromatic compound having two aromatic rings can be used as a retardation inhibitor. Two or more types of aromatic compounds can be used in combination. In addition to the aromatic hydrocarbon ring, the aromatic ring of the aforementioned aromatic compound includes an aromatic heterocycle. The aromatic heterocycle is particularly preferred. The aromatic heterocycle is generally an unsaturated heterocycle, and 1,3,5-triazine ring is particularly preferred.

When the stabilizer, plasticizer and the aforementioned other additives are added to the cellulose resin, the total amount including them should be 1 percent by mass or more without exceeding 30 percent by mass with respect to the mass of the cellulose resin, preferably 5 through 20 percent by mass.

In the melting and film making process, the film constituting material is required to produce only a small amount of volatile component or no volatile component at all. This is intended to reduce or avoid the possibility of foaming at the time of heating and melting, thereby causing a defect inside the film or deterioration in the flatness on the film surface.

When the film constituting material is melted, the percentage of the volatile component content is 1 percent by mass or less, preferably 0.5 percent by mass or less, more preferably 0.2 percent by mass or less, still more preferably 0.1 percent by mass or less. In the embodiment of the present invention, reduction in heating from 30° C. to 250° C. is measured and calculated using a differential thermogravimetric analyzer (TG/DTA200 by Seiko Electronic Industry Co., Ltd.). This amount is used to represent the amount of the volatile component contained.

Before film formation or at the time of heating, the aforementioned moisture and volatile component represented by the aforementioned solvent is preferably removed from the film constituting material to be used. It can be removed according to a known drying technique. Heating technique, reduced pressure technique or heating/pressure reduction technique can be utilized. The removing operation can be done in the air or under the atmosphere where nitrogen is used as an inert gas. When the aforementioned known drying technique is used, the temperature should be in such a range that the film constituting material is not decomposed. This is preferred to maintain satisfactory film quality.

Drying before formation of a film reduces the possibility of volatile components being generated. It is possible to dry the resin singly or to dry after separation into a mixture or compatible substance between the resin and at least one of the film constituting materials other than resin. The drying temperature is preferably 100° C. or more. If the material to be dried contains a substance having a glass transition temperature, the material may be welded and may become difficult to handle when heated to the drying temperature higher than the glass transition temperature thereof. Thus, the drying temperature is preferably below the glass transition temperature. If a plurality of substances have glass transition temperatures, the lower glass transition temperature is used as a standard. This temperature is preferably 100° C. or more without exceeding (glass transition temperature −5)° C., more preferably 110° C. or more without exceeding (glass transition temperature −20)° C. The drying time is preferably 0.5 through 24 hours, more preferably 1 through 18 hours, still more preferably 1.5 through 12 hours. If the drying temperature is too low, the volatile component removal rate will be reduced and the drying time will be prolonged. Further, the drying process can be divided into two steps. For example, the drying process may contain the steps; a preliminary drying step for material storage and an immediately preceding drying step to be implemented immediately before film formation through one week before film formation.

The melt-casting film forming method can be classified into molding methods for heating and melting. It is possible to use the melt extrusion molding method, press molding method, inflation method, injection molding method, blow molding method and orientation molding method. Of these, the melt extrusion method is preferred in order to ensure an optical film characterized by excellent mechanical strength and surface accuracy. The following describes the film manufacturing method as an embodiment of the present invention with reference to the melt extrusion method.

Figure 1:
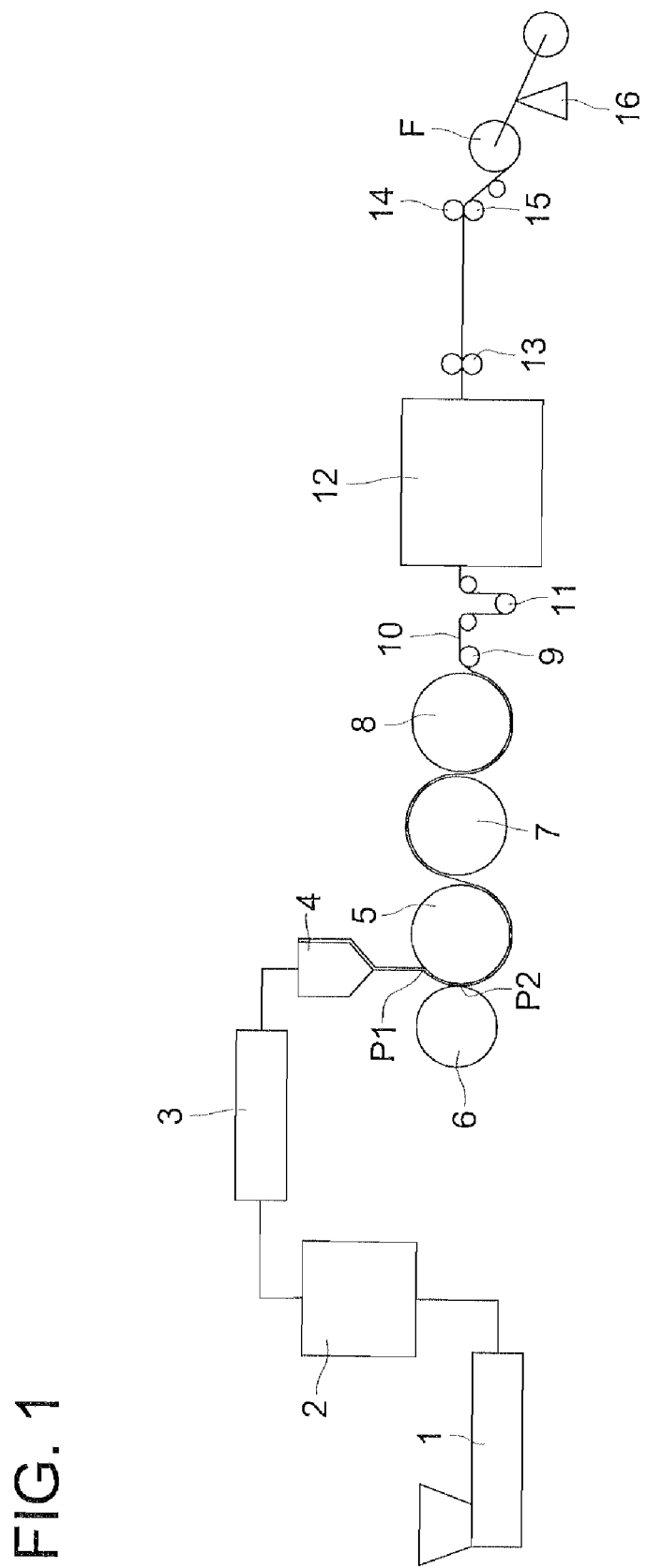
FIG. 1 is a schematic flow sheet representing one embodiment of an apparatus for embodying the manufacturing method of the optical film as an embodiment of the present invention.
Figure 2:
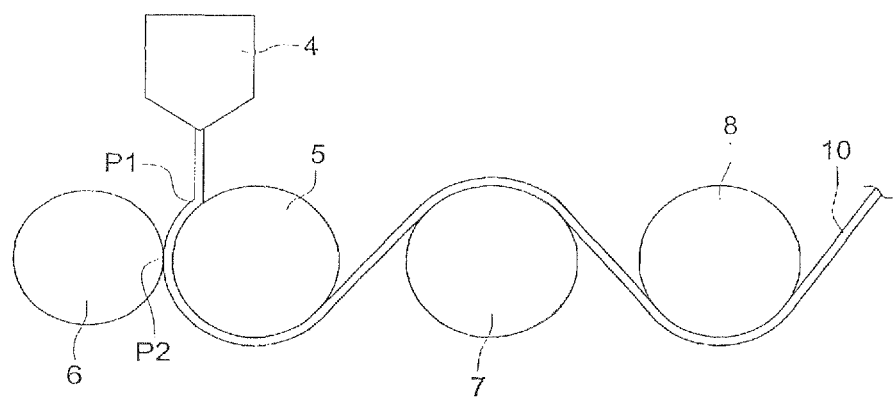
FIG. 2 is an enlarged flow sheet representing the major portion of the manufacturing equipment.

FIG. 1 is a schematic flow sheet representing one embodiment of an apparatus for embodying the manufacturing method of the optical film as an embodiment of the present invention. FIG. 2 is an enlarged flow sheet representing the portion from flow casting die to the cooling roll.

In the film manufacturing method as an embodiment of the present invention shown in FIGS. 1 and 2, the film material such as a cellulose resin is mixed and then melt welding is performed by the extruder 1 from a flow casting die 4 to a first cooling roll 5 so as to circumscribe the material with the first cooling roll 5. Further, the material is cooled and solidified through sequential circumscription with a total of three cooling rolls including the second cooling roll 7, third cooling roll 8, whereby a film 10 is produced. Then both ends of the film 10 separated by the separation roll 9 are sandwiched by the orientation apparatus 12 and this film is oriented across the width. After that, the film is wound by a winding apparatus 16. Further, to improve the flatness, a touch roll 6 is provided to press (pinch) the melted film against a surface of a first cooling roll 5. The surface of this touch roll 6 is elastic and a nip is formed between this roll and the first cooling roll 5. The details of the touch roll 6 will be discussed later.

In the optical film manufacturing method as an embodiment of the present invention, melt extrusion conditions can be the same as those used for the thermoplastic resin including other polyesters. In this case, the material is preferably dried in advance. A vacuum or pressure reduced dryer and a dehumidified hot air dryer is preferably used to dry so that the moisture will be 1000 ppm or less, more preferably 200 ppm or less.

For example, the cellulose ester based resin dried by hot air, under vacuum or under reduced pressure is extruded by an extruder 1, and is melted at an extrusion temperature of about 200 through 300° C. This material is then filtered by a leaf disk type filter 2 or the like to remove foreign substances.

When the material is introduced from the supply hopper (not illustrated) to the extruder 1, it is preferred to create a vacuum, pressure reduced environment or inert gas atmosphere, thereby preventing decomposition by oxidation.

If such additive as a plasticizer is not mixed in advance, it can be added and kneaded during the extrusion process in the extruder. A mixing apparatus such as a static mixer 3 is preferably used to ensure uniform addition.

In the embodiment of the present invention, the cellulose resin and the additives such as a stabilizer to be added as required are mixed preferably before melting. The cellulose resin and stabilizer are more preferably mixed first. A mixer may be used for mixing. Alternatively, mixing may be done in the cellulose resin preparation process, as described above. When the mixer is used, it is possible to use a general mixer such as a V-type mixer, conical screw type mixer, horizontal cylindrical type mixer, Henschel mixer and ribbon mixer.

As described above, after the film constituting material has been mixed, the mixture can be directly melted by the extruder 1, thereby forming a film. It is also possible to make such arrangements that, after the film constituting material has been pelletized, the aforementioned pellets are melted by the extruder 1, thereby forming a film. Further, when the film constituting material contains a plurality of materials having different melting points, melting is performed at the temperature where only the material of lower melting point can be melted, thereby producing a patchy (spongy) half-melt. This half-melt is put into the extruder 1, whereby a film is formed. When the film constituting material contains the material that is easily subjected to thermal decomposition, it is preferred to use the method of creating a film directly without producing pellets for the purpose of reducing the number of melting, or the method of producing a patchy half-melt followed by the step of forming a film, as described above.

Various types of extruders sold on the market can be used as the extruder 1, and a melting and kneading extruder is preferably used. Either the single-screw extruder or twin screw extruder may be utilized. If a film is produced directly from the film constituting material without manufacturing the pellet, an adequate degree of kneading is required. Accordingly, use of the twin screw extruder is preferred. However, the single-screw extruder can be used when the form of the screw is modified into that of the kneading type screw such as a Maddox type, Unimelt type and Dulmage type, because this modification provides adequate kneading. When the pellet and patchy half-melt is used as a film constituting material, either the single-screw extruder and twin screw extruder can be used.

In the process of cooling inside the extruder 1 or subsequent to extrusion, the density of oxygen is preferably reduced by replacement with such an inert gas as nitrogen gas or by pressure reduction.

The desirable conditions for the melting temperature of the film constituting material inside the extruder 1 differ depending on the viscosity of the film constituting material and the discharge rate or the thickness of the sheet to be produced. Generally, the melting temperature is Tg or more without exceeding Tg+100° C. with respect to the glass transition temperature Tg of the film, preferably Tg+10° C. or more without exceeding Tg+90° C. The melting viscosity at the time of extrusion is 10 through 100000 poises, preferably 100 through 10000 poises. Further, the film constituting material retention time in the extruder 1 is preferably shorter. This time is within 5 minutes, preferably within 3 minutes, more preferably within 2 minutes. The retention time depends on the type of the extruder 1 and conditions for extrusion, but can be reduced by adjusting the amount of the material supplied, and L/D, screw speed, and depth of the screw groove.

The shape and speed of the screw of the extruder 1 are adequately selected according to the viscosity of the film constituting material and discharge rate. In the embodiment of the present invention, the shear rate of the extruder 1 is 1/sec through 10000/sec, preferably 5/sec through 1000/sec, more preferably 10/sec through 100/sec.

The extruder 1 in the embodiment of the present invention can generally be obtained as a plastic molding machine.

The film constituting material extruded from the extruder 1 is sent to the flow casting die 4 and is extruded from the slit of the flow casting die 4 in the form of a film. There is no restriction to the flow casting die 4 if it can be used to manufacture a sheet and film. The material of the flow casting die 4 is exemplified by hard chromium, chromium carbide, chromium nitride, titanium carbide, titanium carbonitride, titanium nitride, cemented carbide and ceramics (e.g., tungsten carbide, aluminum oxide, chromium oxide), which are sprayed or plated, and are subjected to surface treatment by buffing, lapping with a grinding wheel having a count 1000 and after, plane cutting with a diamond wheel having a count 1000 (cutting in the direction perpendicular to the resin flow), electrolytic polishing, and composite electrolytic polishing. The preferred material of the lip of the flow casting die 4 is the same as that of the flow casting die 4. The surface accuracy of the lip is preferably 0.5 S or less, more preferably 0.2 S or less.

Figure 3A:
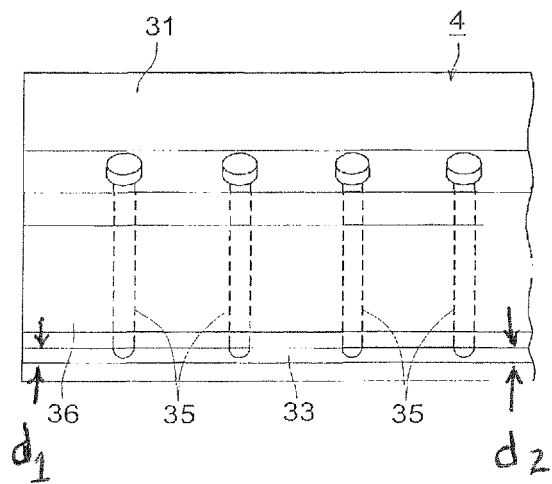
FIG. 3(*a*) is an external view of the major portions of the flow casting die.
Figure 3B:
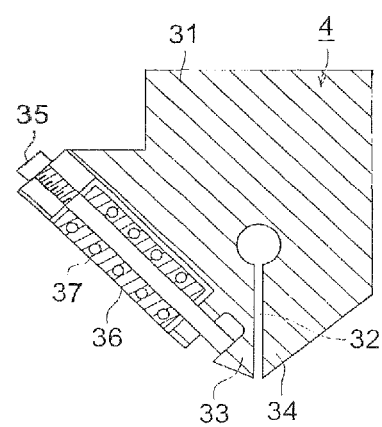

The slit of this flow casting die 4 is constructed so that the gap can be adjusted. This is illustrated in FIG. 3. One of a pair of lips constituting the slit 32 of the flow casting die 4 is a flexible lip 33 which is less rigid and more likely to deform. The other is a stationary lip 34. A great many heat bolts 35 are arranged at a predetermined pitch across the width of the flow casting die 4, namely, along the length of the slit 32. Each of the heat bolts 35 is provided with a block 36, which is equipped with an embedded electric heater 37 and coolant passage. Each of the heat bolts 35 is led through each of the blocks 36 in the longitudinal direction. The base of the heat bolt 35 is secured to the die body 31, and the tip end is engaged with the external surface of the flexible lip 33. While the block 36 is air-cooled at all times, the input of the embedded electric heater 37 is adjusted, and the temperature of the block 36 is also adjusted. This procedure provides thermal extension and contraction of the heat bolt 35, and displaces the flexible lip 33, whereby the thickness of the film is adjusted. A thickness gauge is arranged at required positions in the wake of the die. The information on web thickness having been detected by this gauge is fed back to the control apparatus. The information on the thickness is compared with the preset thickness information by a control apparatus, and the power or on-rate of the heat generating member of the heat bolt can be controlled in response to the signal of correction control amount coming from this apparatus. The heat bolt preferably has a length of 20 through 40 cm and a diameter of 7 through 14 mm. A plurality of heat bolts (e.g., scores of heat bolts) are arranged preferably at a pitch of 20 through 40 mm. Instead of the heat bolt, it is possible to provide a gap adjusting member mainly made up of a bolt that adjusts the slip gap by manual movement in the longitudinal direction along the axis. The slit gap adjusted by the gap adjusting member is normally 200 through 1000 μm, preferably 300 through 800 μm, more preferably 400 through 600 μm.

The first through third cooling rolls are seamless steel tubes having a wall thickness of about 20 through 30 mm, and the surfaces thereof are mirror-finished. A tube is provided inside to allow coolant to flow, and the heat from the film on the roll is absorbed by the coolant flowing through the tube. Of these first through third cooling rolls, the first cooling roll 5 corresponds to the rotary support member of the present invention.

In the meantime, the surface of the touch roll 6 engaged with the first cooling roll 5 is elastic and is deformed along the surface of the first cooling roll 5 by the pressure applied to the first cooling roll 5, whereby a nip is formed between the touch roll 6 and the first roll 5. To be more specific, the touch roll 6 corresponds to the rotary pinch member of the present invention.

Figure 4:
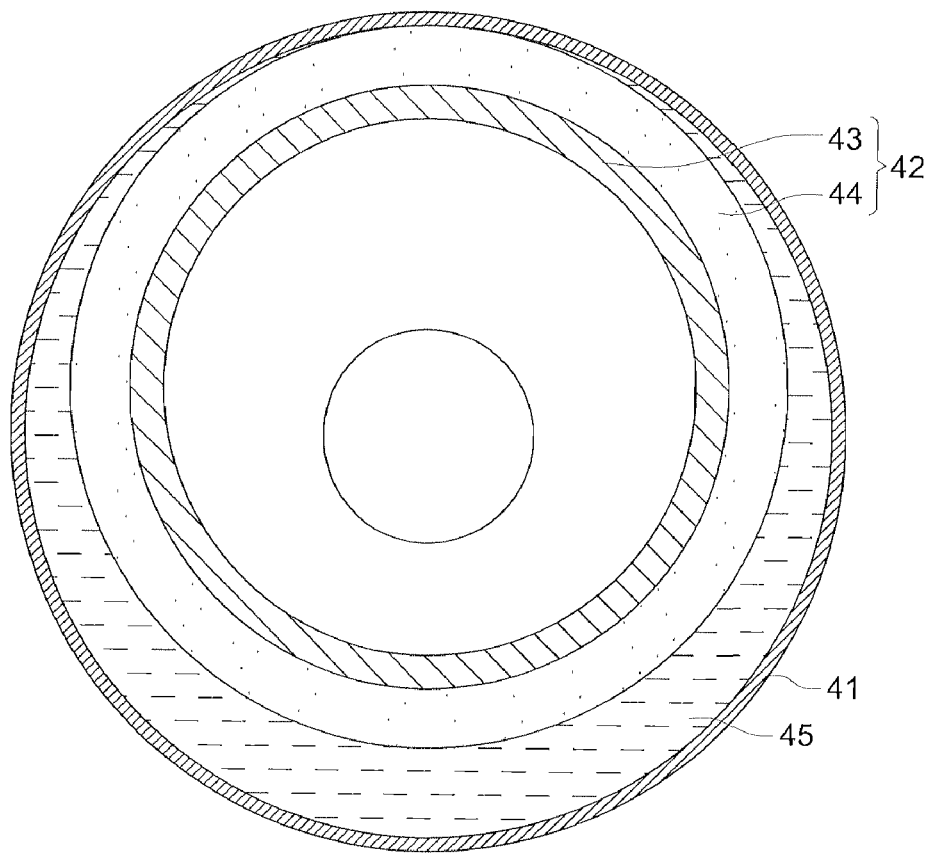
FIG. 4 is a cross sectional view of the first embodiment of the rotary pinch member.

FIG. 4 is a schematic cross sectional view of an equipment (hereinafter referred to as "touch roll A") of the touch roll 6. As illustrated, the touch roll A is made up of an elastic roller 42 arranged inside the flexible metallic sleeve 41.

The metallic sleeve 41 is made of stainless steel having a thickness of 0.3 mm, and is flexible. If the metallic sleeve 41 is too thin, the strength will be insufficient. If the thickness is excessive, elasticity will be insufficient. This signifies that the thickness of the metallic sleeve 41 is preferably 0.1 mm or more without exceeding 1.5 mm. To be more specific, if the thickness of the metallic sleeve 41 is below 0.1 mm, the strength becomes insufficient, and the sleeve breaks after a short-term use. In the meantime, if the thickness of the metallic sleeve 41 is above 1.5 mm, elasticity is insufficient, and this prevents deformation from occurring along the surface of the first cooling roll 5. The elastic roller 42 is structured in such a way that a rubber 44 is arranged on the surface of the metallic inner cylinder 43 which is freely rotated through the bearing, and is shaped into a roll. When the touch roll A is pressed against the first cooling roll 5, the elastic roller 42 causes the metallic sleeve 41 to be pressed against the first cooling roll 5. The metallic sleeve 41 and elastic rollers 42 are deformed in conformity to the shape of the first cooling roll 5, whereby a nip is formed between this roll and the first cooling roll. Coolant 45 flows through the space formed between the metallic sleeve 41 and the elastic roller 42.

Figure 5:
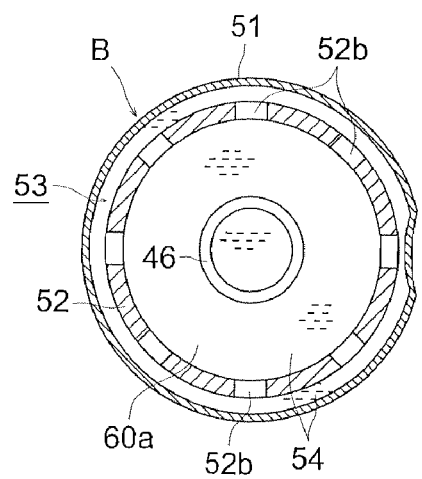
FIG. 5 is a cross sectional view representing the plane surface perpendicular to the rotary axis in the second embodiment of the rotary pinch member.
Figure 6:
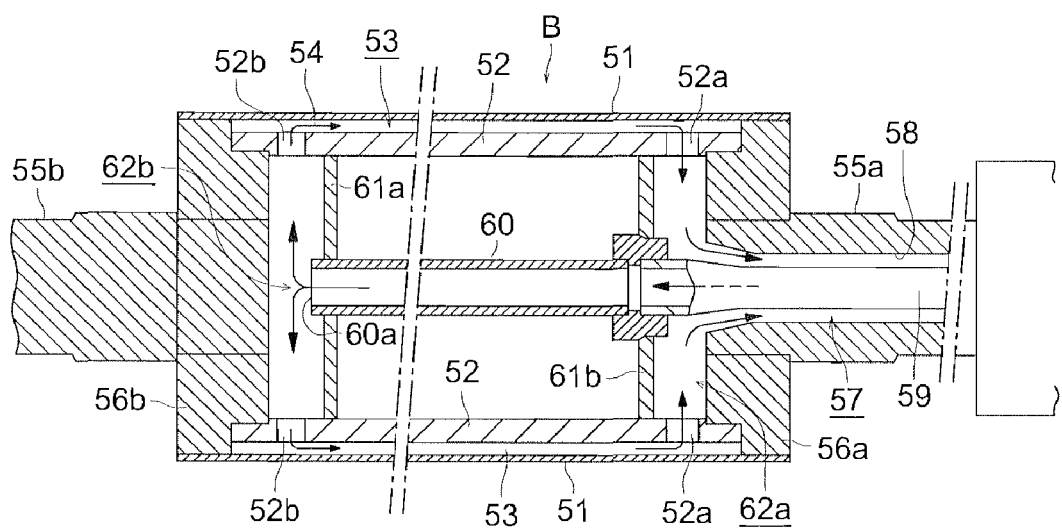
FIG. 6 is a cross sectional view representing the plane surface including the rotary axis in the second embodiment of the rotary pinch member.

FIGS. 5 and 6 show a touch roll B as another embodiment of the rotary pinch member. The touch roll B approximately includes an outer cylinder 51 made of a flexible and seamless stainless steel tube (thickness: 4 mm), and a highly rigid metallic inner cylinder 52 arranged on the same axial form inside this outer cylinder 51. Coolant 54 flows through the space 53 between the outer cylinder 51 and the inner cylinder 52. To put it in greater details, the touch roll B is constructed in such way that the rotary shafts 55*a* and 55*b* on both ends are provided with outer cylinder support flanges 56*a* and 56*b*, and a thin metallic outer cylinder 51 is mounted between the outer peripheral portions on both of these outer cylinder support flanges 56*a* and 56*b*. A fluid supply tube 59 is arranged in the same axial form in the fluid outlet 58 which is formed on the axial portion of the rotary shaft 55*a* to form a fluid return passage 57. This fluid supply tube 59 is fixed by connection with the fluid bush 60 arranged on the axial portion inside the thin metallic outer cylinder 51. Both ends of this fluid bush 60 are provided, respectively with the inner cylinder support flanges 61*a* and 61*b*. A metallic inner cylinder 52 having a thickness of about 15 through 20 mm is mounted over the distance from between the outer peripheral portions of these inner cylinder support flanges 61*a* and 61*b* to the outer cylinder support flange 56*b* on the other end. A coolant flow space 53 of about 10 mm is formed between this metallic inner cylinder 52 and thin metallic outer cylinder 51. An outlet 52*a* and inlet 52*b* for communicating with the flow space 53 and intermediate passages 62*a* and 62*b* outside the inner cylinder support flanges 61*a* and 61*b* are formed in the vicinity of both ends of the metallic inner cylinder 52, respectively.

To provide softness, flexibility and stability comparable to that of rubber elasticity, the outer cylinder 51 is made as thin as possible to the extent to which the thin cylinder theory of elastodynamics is applicable. The flexibility evaluated according to the thin cylinder theory is expressed in terms of wall thickness t/roll radius r. The smaller the t/r, the higher the flexibility. The optimum flexibility of the touch roll B is achieved when $t/r \leqq 0.03$. Normally, a commonly used touch roll is long from side to side, with a roll diameter R of 200 through 500 mm (roll radius r=R/2), a roll effective width L of 500 through 1600 mm, wherein r/L<1. As shown in FIG. 6, when the roll diameter R is 300 mm and the roll effective width L is 1200 mm, the wall thickness t is applicable to 150×0.03=4.5 mm or less. When pressure is applied to the melted sheet width of 1300 mm at the average linear pressure of 10 kN/m, the wall thickness of the outer cylinder 51 is 3 mm as compared with the rubber roll of the same profile. Thus, approximately the same value as the nip width of 12 mm of this rubber roll is recorded when the equivalent spring constant is the same and the nip width k of the roll d having a nip between the outer cylinder 51 and cooling roll is also about 9 mm. Thus, it is apparent that pressure can be applied under the same conditions. It should be noted that deflection is about 0.05 through 0.1 mm at the aforementioned nip width k.

In the above description, $t/r \leqq 0.03$ is assumed as constituting the optimum condition. If the $t/r \leqq 0.05$ is used, sufficient flexibility can be obtained. If t/r is above 0.05, flexibility will be insufficient and this disables deformation along the surface of the first cooling roll 5. In the case of a general roll diameter R of 200 through 500 mm, especially in the range of 2 $mm \leqq t \leqq 5$ mm, sufficient flexibility is ensured, and the thickness can be easily reduced by machining. This provides a very practical range. If the wall thickness is 2 mm or less, high-precision machining will be disabled by elastic deformation at the time of machining, and manufacturing will be difficult.

The equivalent of the aforementioned 2 $mm \leqq t \leqq 5$ mm is $0.008 \leqq t/r \leqq 0.05$ for a common roll diameter. To be more specific, if the t/r is below 0.008, manufacturing will be difficult. For practical purposes, the wall thickness should be increased in proportion to the roll diameter when the $t/r \approx$ is 0.03. For example, the range is t=2 through 3 mm when the roll diameter R is 200, and t=4 through 5 mm when roll diameter R is 500.

The aforementioned touch rolls A and B are energized in the direction of the first cooling roll by the energizing device (not illustrated). The value F/W (linear pressure) obtained by dividing the energizing force F of the energizing device by width W of the film in the nip along the rotary shaft of the first cooling roll 5 is set at 1 kN/m or more without exceeding 15 kN/m. According to the present embodiment, a nip is formed between the touch rolls A and B, and the first cooling roll 5. Flatness can be corrected while the nip passes through the aforementioned nip. Accordingly, as compared to the case where the touch roll is made up of a rigid body without a nip being formed between this roll and the first cooling roll, the film is pressed at a smaller linear pressure for a longer time. This arrangement ensures more reliable correction of the flatness. To be more specific, if the linear pressure is smaller than 1 kN/m, the die line cannot sufficiently be removed. Conversely, of the linear pressure is greater than 15 kN/m, the film cannot pass through the nip, with the result that irregularity will be produced. If the linear pressure is set at 5 kN/m or more without exceeding 10 kN/m, the die line can be removed very effectively, and the irregularity in film thickness can be minimized.

Further, because the surfaces of the touch rolls A and B are made of metal, they can be made smoother than when the surfaces of the touch rolls are made of rubber, so that a very smooth film can be produced. Ethylene propylene rubber, neoprene rubber and silicon rubber can be used to manufacture the elastic body 44 of the elastic roller 42.

To ensure effective removal of the die line by the touch roll 6, it is important that the viscosity of the film sandwiched and pressed by the touch roll 6 should be within a pertinent range. Further, the cellulose resin is known to be subjected to a greater change in the viscosity by temperature. Thus, in order to ensure that the viscosity of the cellulose film sandwiched and pressed by the touch roll 6 is set in a pertinent range, the temperature of the cellulose film sandwiched and pressed by the touch roll 6 should be set in a pertinent range. The present inventors have found out that, when the glass transition temperature of the optical film is assumed as Tg, the film temperature T immediately before the film is sandwiched and pressed by the touch roll 6 should be set so as to meet $Tg<T<Tg+110°$ C. If the film temperature T is lower than Tg, film viscosity will be too high to correct the die line. Conversely, if the film temperature T is higher than $Tg+110°$ C., uniform adhesion between the film surface and roll cannot be achieved, with the result that the die line cannot be corrected. This temperature is preferably $Tg+10°$ C.$<T2<Tg+90°$ C., more preferably $Tg+20°$ C.$<T2<Tg+70°$ C. The temperature of the cellulose film sandwiched and pressed by the touch roll 6 can be set to a pertinent range by adjusting the length L from the nip between the first cooling roll 5 and touch roll 6, along the rotational direction of the first cooling roll 5, to the position P1 wherein the melt extruded from the flow casting die 4 is brought in contact with the first cooling roll 5.

In the embodiment of the present invention, carbon steel, stainless steel and resin are preferably used as a material of the first roll 5 and second roll 6. Further, the surface accuracy is preferably improved. The surface roughness is preferably 0.3 S or less, more preferably 0.01 S or less.

In the embodiment of the present invention, it has been found out that, if the pressure is reduced to 70 kPa or less in the portion from the opening (lip) of the flow casting die 4 to the first roll 5, the aforementioned die line can be effectively corrected. In this case, this pressure is preferably reduced to 50 kPa or more without exceeding 70 kPa. There is no restriction to the method for ensuring that the pressure in the portion from the opening (lip) of the flow casting die 4 to the first roll 5 is kept at 70 kPa or less. For example, it is possible to reduce the pressure if the portion around the roll from the flow casting die 4 is covered with a pressure resistant member. In this case, a suction apparatus is preferably heated by a heater so that a sublimate is not deposited on the apparatus per se. In the embodiment of the present invention, if the suction pressure is too small, a sublime cannot be effectively sucked. This requires an appropriate suction pressure to be selected.

In the embodiment of the present invention, while the melted film-like cellulose ester-based resin coming from the flow casting die 4 is conveyed by sequential contact with the first roll (the first cooling roll) 5, second cooling roll 7 and third cooling roll 8, the resin is cooled and solidified, whereby an unoriented cellulose ester based resin film 10 is obtained.

In the embodiment of the present invention shown in FIG. 1, the film 10 which is separated from the third cooling roll 8 by the separation roll 9 and is cooled, solidified and unoriented is led to the drawing machine 12 through the dancer roll (film tension adjusting roll) 11. The film 10 is drawn in the lateral direction (across the width) by this drawing machine. This process of drawing causes the molecules to be oriented in the film.

A known tenter can be preferably used to draw the film across the width. Particularly, drawing the film across the width allows the lamination with the polarizing film to be implemented in the form of a roll. Drawing across the width ensures that the low axis of the optical film made up of the cellulose ester based resin film is oriented across the width.

The transmission axis of the polarizing film is usually oriented across the width too. The polarizing plate, which is laminated in such a way that the transmission axis of the polarizing film and the low axis of the optical film is parallel to each other, is incorporated into the liquid crystal display, this arrangement improves the display contrast of the liquid crystal display, and provides an excellent viewing angle.

The glass transition temperature Tg of the film constituting material can be controlled when the types of the materials constituting the film and the proportion of the constituting materials are made different. When the phase difference film is manufactured as an optical film, it is preferable that Tg is 120° C. or more, preferably 135° C. or more. In the liquid crystal display, the film temperature environment is changed in the image display mode by the temperature rise of the apparatus per se, for example, by the temperature rise caused by a light source. In this case, if the Tg of the film is lower than the film working environment temperature, a big change will occur to the retardation value and film geometry resulting from the orientation status of the molecules fixed inside the film by drawing. If the Tg of the film is too high, temperature is raised when the film constituting material is formed into a film. This will increase the amount of energy consumed for heating. Further, the material may be decomposed at the time of forming a film, and this may cause coloring. Thus, Tg is preferably kept at 250° C. or less.

The process of cooling and relaxation under known thermal setting conditions can be applied in the drawing process. Appropriate adjustment should be made to obtain the characteristics required of the intended optical film.

The aforementioned drawing process and thermal setting process are applied as appropriate to provide the phase film function for the purpose of improving the physical properties of the phase film and to increase the viewing angle in the liquid crystal display. When such a drawing process and thermal setting process are included, the heating and pressing process in the embodiment of the present invention should be performed prior to the drawing process and thermal setting process.

When a phase difference film is produced as an optical film, and the functions of the polarizing plate protective film are combined, control of the refractive index is essential. The refractive index control can be provided by the process of drawing. The process of drawing is preferred. The following describes the method for drawing:

In the phase difference film drawing process, required retardations Ro and Rth can be controlled by a drawing magnification of 1.0 through 2.0 in one direction of the cellulose resin, and a drawing magnification of 1.01 through 2.5 times in the direction perpendicular to the inner surface of the film. Here Ro denotes an in-plane retardation. It represents the thickness multiplied by the difference between the refractive index in the longitudinal direction MD in the same plane and that across the width TD. Rth denotes the retardation along the thickness, and represents the thickness multiplied by the difference between the refractive index (an average of the values in the longitudinal direction MD and across the width TD) in the same plane and that along the thickness.

Drawing can be performed sequentially or simultaneously, for example, in the longitudinal direction of the film and in the direction perpendicular in the same plane of the film, namely, across the width. In this case, if the drawing magnification at least in one direction is insufficient, sufficient phase difference cannot be obtained. If it is excessive, drawing difficulties may occur and the film may break.

Drawing in the biaxial directions perpendicular to each other is an effectively way for keeping the film refractive indexes nx, ny and nz within a predetermined range. Here nx denotes a refractive index in the longitudinal direction MD, ny indicates that across the width TD, and nz represents that along the thickness.

When the material is drawn in the melt-casting direction, the nz value will be excessive if there is excessive shrinkage across the width. This can be improved by controlling the shrinkage of the film across the width or by drawing across the width. In the case of drawing across the width, distribution may occur to the refractive index across the width. This distribution may appear when a tenter method is utilized. Drawing of the film across the width causes shrinkage force to appear at the center of the film because the ends are fixed in position. This is considered to be what is called "bowing". In this case, bowing can be controlled by drawing in the casting direction, and the distribution of the phase difference across the width can be reduced.

Drawing in the biaxial directions perpendicular to each other reduces the fluctuation in the thickness of the obtained film. Excessive fluctuation in the thickness of the phase difference film will cause irregularity in phase difference. When used for liquid crystal display, irregularity in coloring or the like will occur.

The fluctuation in the thickness of the cellulose resin film is preferably kept within the range of ±3%, further down to ±1%. To achieve the aforementioned object, it is effective to use the method of drawing in the biaxial directions perpendicular to each other. In the final phase, the magnification rate of drawing in the biaxial directions perpendicular to each other is preferably 1.0 through 2.0 in the casting direction, and 1.01 through 2.5 across the width. Drawing in the range of 1.01 through 1.5 in the casting direction and in the range of 1.05 through 2.0 across the width will be more preferred to get a retardation value.

When the absorption axis of the polarizer is present in the longitudinal direction, matching of the transmission axis of the polarizer is found across the width. To get a longer polarizing plate, the phase difference film is preferably drawn so as to get a low axis across the width.

When using the cellulose resin to get positive double refraction with respect to stress, drawing across the width will provide the low axis of the phase difference film across the width because of the aforementioned arrangement. In this case, to improve display quality, the low axis of the phase difference film is preferably located across the width. To get the target retardation value, it is necessary to meet the following relationship:

(Drawing magnification across the width)>(drawing magnification in casting direction)

After drawing, the end of the film is trimmed off by a slitter 13 to a width predetermined for the product. Then both ends of the film are knurled (embossed) by a knurling apparatus made up of an emboss ring 14 and back roll 15, and the film is wound by a winder 16. This arrangement prevents sticking in the optical film F (master winding) or scratch. Knurling can be provided by heating and pressing a metallic ring having a pattern of projections and depressions on the lateral surface. The gripping portions of the clips on both ends of the film are normally deformed and cannot be used as a film product. They are therefore cut out and are recycled as a material.

When the phase difference film is used as a protective film of the polarizing plate, the thickness of the aforementioned protective film is preferably 10 through 500 μm. Particularly, the lower limit is 20 μm or more, preferably 35 μm or more. The upper limit is 150 μm or less, preferably 120 μm or less. A particularly preferred range is 25 through 90 μm. If the phase difference film is too thick, the polarizing plate subsequent to machining will be too thick. This fails to meet low-profile light weight requirements when employed in the liquid crystal display for a notebook PC or mobile type electronic equipment. Conversely, if the phase difference film is too thin, retardation as a phase difference film cannot occur easily. Further, the film moisture permeability will be increased, with the result that the polarizer cannot be effectively protected from moisture. This must be avoided.

The low axis or high axis of the phase difference film is present in the same plane of the film. Assume that the angle with respect to the direction of film formation is θ1. Then the θ1 should be −1 degrees or more without exceeding +1 degrees, preferably −0.5 degrees or more without exceeding +0.5 degrees.

This θ1 can be defined as an orientation angle. It can be measured by an automatic double refractometer KOBRA-21ADH (by Oji Scientific Instruments).

If θ1 meets the aforementioned relationship, a high degree of brightness is ensured in the display image and a leakage of light is reduced or prevented, with the result that faithful color representation is provided in the color liquid crystal display.

When the phase difference film as an embodiment of the present invention is used in the multiple-domain VA mode, the arrangement of the phase difference film improves the display quality of the image if the high axis of the phase difference film is θ1, and the film is arranged in the aforementioned area. When the polarizing plate and liquid crystal display apparatus are set to MVA mode, a structure shown in FIG. 7 can be used, for example.

Figure 7:
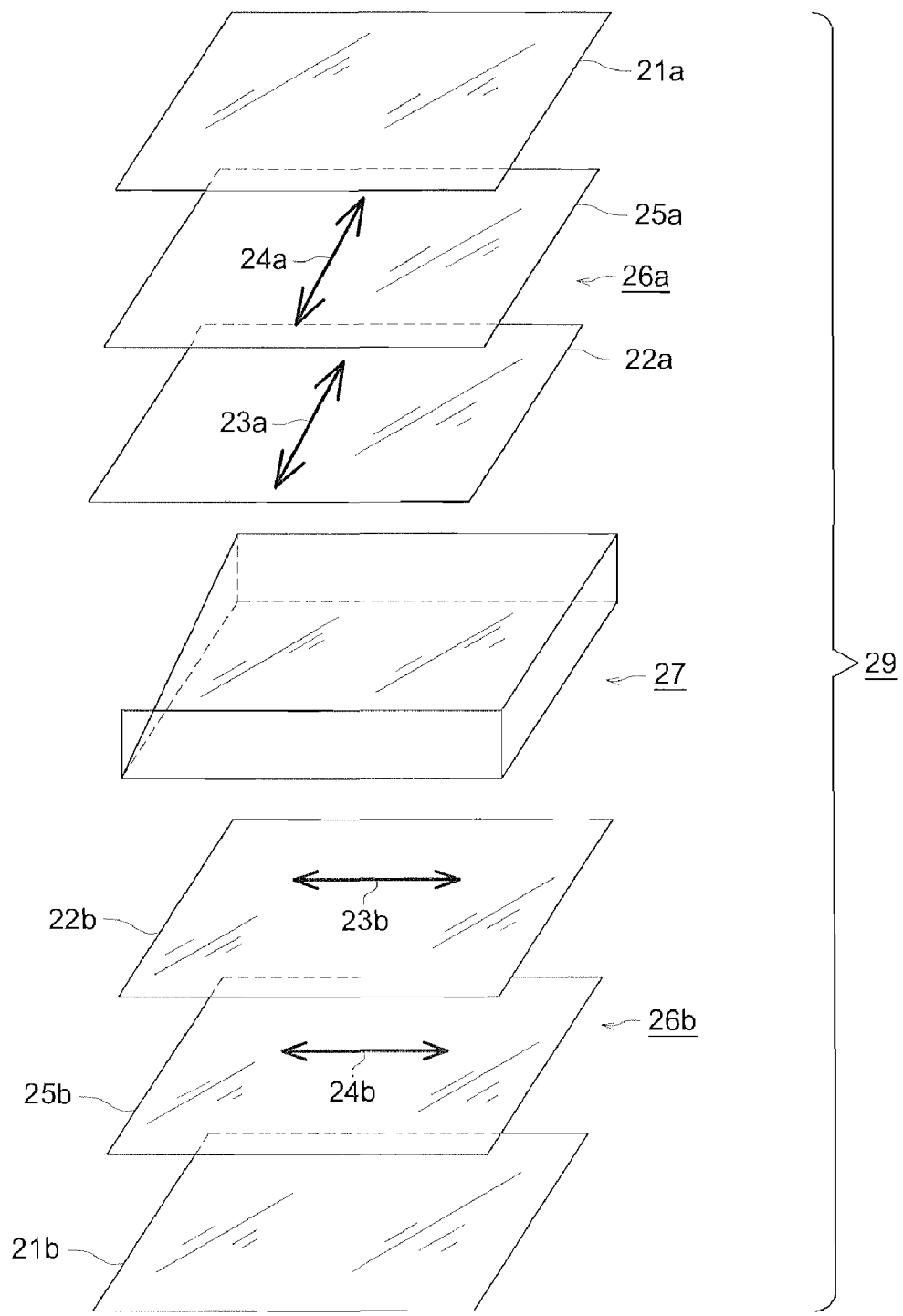
FIG. 7 is an exploded perspective view schematically representing the structure of the liquid crystal display.

In FIG. 7, the reference numerals 21a and 21b indicate protective films, 22a and 22b represent phase difference films, 25a and 25b show polarizers, 23a and 23b indicate the low-axis directions of the film, 24a and 24b show the directions of the polarizer transmission axis, 26a and 26b denote polarizing plates, 27 shows a liquid crystal cell, and 29 denotes a liquid crystal display.

The distribution of the retardation Ro in the in-plane direction of the optical film is adjusted to preferably 5% or less, more preferably 2% or less, still more preferably 1.5% or less. Further, the distribution of retardation Rt along the thickness of the film is adjusted to preferably 10% or less, more preferably 2% or less, still more preferably 1.5% or less.

In the phase difference film, the fluctuation in the distribution of the retardation value is preferred to be as small as possible. When a polarizing plate containing the phase difference film is used in the liquid crystal display apparatus, a smaller fluctuation in the distribution of the aforementioned retardation is preferred for the purpose of preventing color irregularity.

In order to adjust the phase difference film so as to provide the retardation value suited for improvement of the display quality of the liquid crystal cell in the VA mode or TN mode and to divide the aforementioned multi-domain especially in the VA mode for preferable use in the MVA mode, adjustment must be made to ensure that the in-plane retardation Ro is greater than 30 nm without exceeding 95 nm, and retardation Rt along the thickness is greater than 70 nm without exceeding 400 nm.

In the configuration shown in FIG. 7 wherein two polarizing plates are arranged in a crossed-Nicols configuration and a liquid crystal cell is arranged between the polarizing plates, assuming a crossed-Nicols configuration with respect to the standard wherein observation is made from the direction normal to the display surface. When viewed from the direction away from the line normal to the display surface, a deviation occurs from the crossed-Nicols arrangement of the polarizing plate, and causes the leakage of light. This leakage is mainly compensated for by the aforementioned in-plane retardation Ro. In the aforementioned TN mode and VA mode, particularly in the MVA mode, when the liquid crystal cell is set to the black-and-white display mode, the retardation along the thickness mainly compensates for the double refraction of the liquid crystal cell recognized when viewed in a slanting direction in the same manner.

As shown in FIG. 7, when two polarizing plates are arranged on the upper and lower portions of the liquid crystal cell in the liquid crystal display, the reference numerals 22a and 22b in FIG. 7 are capable of selecting the distribution of retardation Rt along the thickness. It is preferred to ensure that the requirements of the aforementioned range are met, and the total of both of the retardations Rt along the thickness is greater than 140 nm without exceeding 500 nm. In this case, both the in-plane retardation Ro of the 22a and 22b and retardation Rt along the thickness retardation Rt are the same for improving the productivity of industrial polarizing plates. It is particularly preferred that the in-plane retardation Ro is greater than 35 nm without exceeding 65 nm, the retardation Rt along the thickness retardation Rt is greater than 90 nm without exceeding 180 nm, and the structure shown in FIG. 7 is applied to the liquid crystal cell in the MVA mode.

In the liquid crystal display apparatus, assuming that the TAC film having an in-plane retardation Ro of 0 through 4 nm, a retardation Rt along the thickness of 20 through 50 nm and a thickness of 35 through 85 μm is used at the position 22b in FIG. 7 as one of the polarizing plates, for example, as a commercially available polarizing plate protective film, the polarizing film arranged on the other polarizing plate, for example, the polarizing film arranged in 22a of FIG. 7 is preferred to have an in-plane retardation Ro of greater than 30 nm without exceeding 95 nm, and the retardation Rt along the thickness of greater than 140 nm without exceeding 400 nm. This arrangement improves the display quality and film productivity.

<Liquid Crystal Display>

The polarizing plate including the phase difference film in the embodiment of the present invention provides higher display quality than the normal polarizing plate. This is particularly suited for use in a multi-domain type liquid crystal display, more preferably to the multi-domain type liquid crystal display in the double refraction mode.

The polarizing plate of the present invention as an embodiment of the present invention can be used in the MVA (Multi-domain Vertical Alignment) mode, PVA (Patterned Vertical Alignment) mode, CPA (Continuous Pinwheel Alignment)

mode and OCB (Optical Compensated Bend) mode, without being restricted to a specific liquid crystal mode or polarizing plate arrangement.

The liquid crystal display is coming into practical use as a colored and animation display. The display quality is improved by the embodiment of the present invention. The improved contrast and enhanced polarizing plate durability ensure faithful animation image display without easy fatigue.

In the liquid crystal display containing at least the polarizing plate incorporating a phase difference film in the embodiment of the present invention, one polarizing plate containing the phase difference film in the embodiment of the present invention is arranged on the liquid crystal cell, or two polarizing plates are arranged on both sides of the liquid crystal cell. In these cases, the display quality is improved when means are provided to ensure that the side of the phase difference film in the embodiment of the present invention contained in the polarizing plate faces the liquid crystal cell of the liquid crystal display. Then the films 22a and 22b of FIG. 7 face the liquid crystal cell of the liquid crystal display.

In the aforementioned structure, the phase difference film in the embodiment of the present invention provides optical compensation of the liquid crystal cell. When the polarizing plate in the embodiment of the present invention is used in the liquid crystal display, at least one of the polarizing plates of the liquid crystal display should be used as a polarizing plate in the embodiment of the present invention. Use of the polarizing plate in the embodiment of the present invention improves the display quality and provides a liquid crystal display having excellent viewing angle.

In the polarizing plate of the embodiment of the present invention, a polarizing plate protective film of cellulose derivative is used on the surface opposite the phase difference film as viewed from the polarizer. A general-purpose TAC film or the like can be employed as the protective film. The polarizing plate protective film, which is located far from the liquid crystal cell, can be provided with another functional layer for the purpose of improving the quality of the display apparatus.

For example, in order to avoid reflection, glare, scratch and dust, and to improve brightness, it is possible to bond the aforementioned functional layer onto the film containing a known functional layer for a display or polarizing plate surface in the embodiment of the present invention, without being restricted thereto.

Generally, to ensure stable optical characteristics, the aforementioned retardation value Ro or Rth are required to be small for the phase difference film. Especially, these fluctuations may cause irregularities of an image in the liquid crystal display in the double refraction mode.

In the embodiment of the present invention, a longer phase difference film produced by the melt-casting film forming method is mainly made of a cellulose resin. This arrangement makes it possible to use the process of alkaline treatment based on the saponification inherent to the cellulose resin. Similarly to the case of the conventional polarizing plate protective film, this can be bonded with the phase difference film in the embodiment of the present invention using an aqueous solution containing a completely saponified polyvinyl alcohol, when the resin constituting the polarizer is polyvinyl alcohol. Thus, the embodiment of the present invention is superior in that the method for manufacturing the conventional polarizing plate can be applied. It is especially advantageous in that a longer roll polarizing plate can be obtained.

The advantage in production of the embodiment of the present invention is more remarkable especially in the production of a longer product in excess of 100 meters. Greater advantages are observed in the production of a polarizing plate when it is longer, for example, in the order of 1500 m, 2500 m and 5000 m.

For example, in the production of a phase difference film, roll length is 10 m or more without exceeding 5000 m, preferably 50 m or more without exceeding 4500 m when the productivity and transportability are taken into account. The width of a polarizer can be selected being suitable for the width of the polarizer and the production line in this case. A film having a width of 0.5 m or more without exceeding 4.0 m, preferably 0.6 m or more without exceeding 3.0 m can be produced, wound in a form of a roll, and used to process a polarizing plate. A film having a width twice or more as great as the intended width also can be produced, wound in a form of a roll, and cut to get the roll of an intended width, and used to process the polarizing plate.

When manufacturing the phase difference film as the embodiment of the present invention, a functional layer such as antistatic layer, hard coated layer, easy glidability layer, adhesive layer, antiglare layer and barrier layer can be coated before and/or after drawing. In this case, various forms of surface treatment such as corona discharging, plasma processing, chemical solution treatment can be provided as appropriate.

In the film making process, the gripping portions of the clips on both ends of the film having been cut can be recycled as the material of the same type or different type of films, after having been pulverized, or after having been pelletized as required.

An optical film of lamination structure can be produced by co-extrusion of the compositions containing cellulose resins having different concentrations of additives such as the aforementioned plasticizer, ultraviolet absorber and matting agent. For example, an optical film made up of a skin layer, core layer and skin layer can be produced. For example, a large quantity of matting agent can be put into the skin layer or the matting agent can be put only into the skin layer. Larger amounts of plasticizer and ultraviolet absorber can be put into the core layer than the skin layer. They can be put only in the core layer. Further, the types of the plasticizer and ultraviolet absorber can be changed in the core layer and skin layer. For example, it is also possible to make such arrangements that the skin layer contains a plasticizer and/or ultraviolet absorber of lower volatility, and that the core layer contains a plasticizer of excellent plasticity or an ultraviolet absorber of excellent ultraviolet absorbing performance. The glass transition temperatures between the skin layer and core layer can be different from each other. The glass transition temperature of the core layer is preferably lower than that of the skin layer. In this case, the glass transition temperatures of both the skin and core are measured, and the average value obtained by calculation from the volume fraction thereof is defined as the aforementioned glass transition temperature Tg so that it is handled in the same manner. Further, the viscosity of the melt including the cellulose ester at the time of melt-casting can be different in the skin layer and core layer. The viscosity of the skin layer can be greater than that of the core layer. Alternatively, the viscosity of the core layer can be equal to or greater than that of the skin layer.

Assuming that the dimension of the film is the standard when left to stand for 24 hours at a temperature of 23° C. with a relative humidity of 55% RH. On this assumption, the dimensional stability of the optical film of the present embodiment is such that the fluctuation of the dimension at 80° C. and 90% RH is within ±2.0% (excl.), preferably within ±1.0% (excl.), more preferably within ±0.5% (excl.).

When the optical film of the present embodiment is used as a protective film of the polarizing plate as the phase difference film, if the phase difference film has a fluctuation in excess of the aforementioned range, the absolute value of the retardation and the orientation angle as a polarizing plate will deviate from the initial setting. This may cause reduction in the capability of improving the display quality, or may result in deterioration of the display quality.

The phase difference film of the present invention can be used for the polarizing plate protective film. When used as a polarizing plate protective film, there is no restriction to the method of producing the polarizing plate. The polarizing plate can be manufactured by a commonly used method. The phase difference film having been obtained is subjected to alkaline treatment. Using an aqueous solution of completely saponified polyvinyl alcohol, the polarizing plate protective films can be bonded on the both surfaces of the polarizer manufactured by immersing the polyvinyl alcohol film in an iodonium solution and by drawing the same. When this method is used, the phase difference film as the polarizing plate protective film in the embodiment of the present invention is directly bonded to at least one of the surfaces of the polarizer.

Instead of the aforementioned alkaline treatment, the film can be provided with simplified adhesion as disclosed in the Japanese Laid-Open Patent Publication No. H06-94915 and Japanese Laid-Open Patent Publication No. H06-118232.

The polarizing plate is made up of a polarizer and protective films for covering both surfaces thereof. Further, a film for protecting can be bonded onto one of the surfaces of the aforementioned polarizing plate and a release sheet can be bonded on the opposite surface. The film for protecting and the release sheet are used to protect the polarizing plate at the time of product inspection before shipment of the polarizing plate. In this case, the film for protecting is bonded to protect the surface of the polarizing plate, and is used on the surface opposite to the surface wherein the polarizing plate is bonded to the liquid crystal. Further, the release sheet is used to cover the adhesive layer to be bonded to the liquid crystal substrate, and is used on the surface wherein the polarizing plate is bonded to the liquid crystal cell.

The present inventors paid attention to the fact that the viscosity of the cellulose resin is greatly changed by temperature. Namely, to ensure effective correction of film flatness, it is important to use an adequate pressure to press the melt having the viscosity appropriate for pressing the melt by a rotary pinch member and to correct the die line and irregularity in thickness. For this purpose, in the embodiment of the present invention, the force F with which the rotary pinch member is energized to the rotary support member is divided by the width W of the film in the nip (hereinafter referred to as "linear pressure" in some cases) is set to 1 kN/m ($\approx$1 kgw/cm) or more without exceeding 15 kN/m ($\approx$15 kgw/cm) The temperature T of the aforementioned melt immediately before being pressed by the nip between the rotary support member and rotary pinch member is adjusted to meet Tg<T<Tg+110° C. with respect to the glass transition temperature Tg of the aforementioned cellulose resin. If the temperature T is lower than glass transition temperature Tg, the melt viscosity will be too high to correct the flatness. If the temperature T is higher than glass transition temperature Tg+110° C., the film will be subjected to whitening a new problem to be solved. In the present embodiment, whitening of the film can be prevented while sufficiently correcting the film flatness.

EXAMPLE

Referring to examples, the following specifically describes the embodiment of the present invention without the present invention being restricted thereto:

Example 1

Cellulose acetate propyonate 100 parts by mass
  (Acetyl group replacement ratio of 1.95 and propionyl group replacement ratio of 0.7),
  Number average molecular weight 75,000, Drying for 24 hours at 60° C.)
Triphenyl phosphate 10 parts by mass
Ethylphthalyl ethylglycolate 2 parts by mass

| TINUVIN 109 | 0.5 parts by mass |
|---|---|
| TINUVIN 171 | 0.5 parts by mass |
| TINUVIN 326 | 0.3 parts by mass |

2,6-di-t-butyl-p-cresol 0.01 parts by mass
Penta-erythrityl-tetrakis [3-(3,5-di-t-butyl-4-hydroxyphenyl) propyonate] (IRGANOX 1010 by Ciba Specialty Chemicals K.K.) 0.01 parts by mass Using a twin-screw extruder, the aforementioned mixture was melted and mixed at 230° C. to produce pellets. The glass transition temperature Tg of these pellets was 136° C. The pellets were melted at a temperature of 250° C., and were extruded onto the first cooling roll 5 from the flow casting die 4. The material was sandwiched and pressed between the first cooling roll 5 and touch roll 6 to mold a film. The heat bolt was adjusted so that the slit gap of the flow casting die 4 would be 0.5 mm at the position within 30 mm from the end of the film across the width, and would be 1 mm at other positions. A touch roll A was used as a touch roll, and water having a temperature of 80° C. was fed therein. The length L along the first cooling roller 5 was set to 20 mm, wherein this length L was the distance between the position P1 wherein the resin extruded from the flow casting die 4 comes in contact with the first cooling roll 5 and the position P2 located at the upstream end in the rotating direction of the first cooling roll 5 of the nip between the first cooling roll 5 and touch roll 6. After that, the touch roll 6 was separated from the first cooling roll 5, thereby measuring the temperature T of the melting section immediately before the material was sandwiched and pressed by the nip between the first cooling roll 5 and touch roll 6. In this example and all other examples thereafter as well as comparative examples, the temperature T of the melting section immediately before the material was sandwiched and pressed by the nip between the first cooling roll 5 and touch roll 6 was measured by a thermometer (HA-200E ANRITSU CORPORATION) at a position further 1 mm upstream from P2 at the upstream end of the nip. In this Example, the temperature T was 141° C. The linear pressure of the touch roll 6 with respect to the first cooling roll 5 was 1.5 kN/m.

The next step was to measure the film thickness and retardation of the optical film obtained in this manner. The film thickness d was measured by a linear gauge (VL-50 by Mitsutoyo Co., Ltd., over the full range across the width of the film at an interval of 5 mm. Calculation was made to get the average value d1 of the film thickness in both end portions 81 having a width of 30 mm starting from respective both ends of the film and the average value d2 of the film thickness measured in an inside portion 83 sandwiched by the aforementioned both end portions 81, See FIG. 8. In this case, however, manufacturing conditions in this manufacturing process was adjusted so that average value d2=80 μm.

Retardation was measured at 30 different positions across the width of the film. To put it more specifically, an automatic double refractometer KOBRA-21ADH (by Oji Scientific Instruments) was used to measure the three-dimensional refractive index at a wavelength of 590 nm at each measuring position in an atmosphere of 23° C. and 55% RH, thereby obtaining the refractive index Nx in the low-axis direction, the refractive index Ny in the high-axis direction and the refractive index Nz along the thickness. From the result of this measurement, the retardation Rt along the thickness was calculated according to the following formula:

$$Rt = \{(Nx+Ny)/2 - Nz\} \times d2$$

This was followed by the step of getting the difference ΔRt between the maximum and minimum values of the retardation Rt measured at 30 position across the width therein, except for the position within 30 mm from both ends of the film.

In addition to Example 1, the linear pressure of the touch roll 6 with respect to the first cooling roll, the temperature T immediately before the film was sandwiched and pressed by the nip and the type of the touch roll was changed while obtaining the average film thickness d1 at the end of the film and the difference ΔRt between the maximum and minimum values of the retardation Rt across the width. In the comparative example 3, the heat bolt was adjusted to make sure that the gap of the flow casting die 4 would be 1 mm throughout across the width of the film.

Tables 1 and 2 show the results of the aforementioned procedures. In Examples 1 and 4 through 8, and comparative examples 7 through 12 shown in Table 1, a touch roll B is employed as a touch roll. The ratio of the wall thickness t2 to the roll radius r is also described. The result of measurement is given in Table 1. In Examples 2, 3 and 9 through 11, and comparative examples 1 through 6 given in Table 2, a touch roll A was used as a touch roll, and the thickness t1 of the metallic sleeve is also given.

As a result, a desired value was obtained as the film thickness d1 at the end in any of the Examples 1 through 11. The difference ΔRt between the maximum and minimum values of the retardation Rt was reduced to a very small level.

By contrast, in the comparative examples 1 and 9, the linear pressure of the touch roll 6 was excessive. In the comparative examples 2 and 8, the linear pressure of the touch roll 6 was insufficient, with the result that ΔRt was increased too much. In the comparative examples 3, 5 and 11, the temperature T at the time of nip entry was insufficient, and the ΔRt was increased. In the comparative example 3, the gap of the flow casting die 4 was set to 1 mm throughout the entire area of the gap. This arrangement increased the film thickness d1 at the end to a considerably high level. In the comparative examples 4 and 12, the temperature T at the time of nip entry was excessive, and this resulted in excessive ΔRt. Further, the film was whitened. In the comparative example 6, 7 and 10, the elasticity of the touch roll 6 was insufficient, and this resulted in excessive ΔRt.

TABLE 1

|  | Linear pressure [kN/m] | Temperature [° C.] | Film thickness at the end d1 [μm] | t2/r | ΔRt [nm] |
|---|---|---|---|---|---|
| Exam. 1 | 1.5 | 141 | 77 | 0.01 | 4 |
| Exam. 4 | 13 | 175 | 74 | 0.04 | 7 |

TABLE 1-continued

|  | Linear pressure [kN/m] | Temperature [° C.] | Film thickness at the end d1 [μm] | t2/r | ΔRt [nm] |
|---|---|---|---|---|---|
| Comp. 7 | 13 | 175 | 77 | 0.06 | 26 |
| Exam. 5 | 8 | 175 | 77 | 0.03 | 2 |
| Exam. 6 | 5 | 175 | 77 | 0.03 | 3 |
| Exam. 7 | 10 | 175 | 77 | 0.03 | 3 |
| Exam. 8 | 8 | 233 | 77 | 0.03 | 3 |
| Cemp. 8 | 0.5 | 175 | 77 | 0.03 | 21 |
| Comp. 9 | 18 | 175 | 77 | 0.03 | 35 |
| Comp. 10 | 8 | 175 | 77 | 0.06 | 26 |
| Comp. 11 | 8 | 120 | 77 | 0.03 | 33 |
| Comp. 12 | 8 | 255 | 77 | 0.03 | 21 |

Comp.; Comparative example
Exam.; Examplet

TABLE 2

|  | Linear pressure [kN/m] | Temperature [° C.] | Film thickness at the end d1 [μm] | t1 [mm] | ΔRt [nm] |
|---|---|---|---|---|---|
| Exam. 2 | 8 | 233 | 76 | 0.3 | 3 |
| Exam. 3 | 13 | 175 | 77 | 1.4 | 7 |
| Comp. 1 | 18 | 141 | 75 | 0.3 | 33 |
| Comp. 2 | 0.5 | 141 | 75 | 0.3 | 17 |
| Comp. 3 | 1.5 | 130 | 95 | 0.3 | 27 |
| Comp. 4 | 1.5 | 250 | 77 | 0.3 | 18 |
| Comp. 5 | 1.5 | 120 | 76 | 0.3 | 33 |
| tamp. 6 | 13 | 175 | 77 | 1.6 | 22 |
| Exam. 9 | 1.5 | 175 | 77 | 0.1 | 8 |
| Exam. 10 | 5 | 233 | 77 | 0.3 | 4 |
| Exam. 11 | 10 | 233 | 77 | 0.3 | 4 |

Comp.; Comparative example
Exam.; Example

What is claimed is:

1. A method for manufacturing a cellulose film, the method comprising the steps of:
   extruding a film of melted material including cellulose resin, in a sheet-like shape, through a flow casting die having a slot therein, through which the melted material is extruded, wherein a gap of the slot, is narrower at each edge position within 30 mm from an end of the film across a width of the film;
   wherein the slot of the casting die is made of a pair of lips having a surface accuracy of 0.5 S or less;
   supporting the film of melted material extruded from the flow casting die, in order of extrusion, on a surface of a rotary support member while rotating the rotary support member; and
   forming the cellulose film out of the film of melted material by pinching the film of melted material at a nip portion which is formed between the rotary support member and a rotary pinch member energized thereto,
   wherein a force F, with which the rotary pinch member is energized to the rotary support member, divided by a width b of the film of melted material at the nip portion is not less than 1 kN/m and not more than 15 kN/m, the rotary pinch member includes a roller covered with a flexible metal sleeve whose thickness is not less than 0.1 mm and not more than 1.5 mm with a space sandwiched between the roller and the flexible metal sleeve or a roll provided with a metal outer cylinder whose thickness is not less than 0.008 times and not more than 0.05 times of a radius of the roll, the metal sleeve or the metal outer cylinder is energized to the rotary support member, and the rotary pinch member pinches the film of melted material when a temperature T of the film of melted material just before being pinched by the nip portion and a glass transition temperature Tg of the cellulose resin satisfy the following relationship Tg<T<Tg+110° C.

2. The method of claim 1, wherein the space is filled with fluid.

3. The method of claim 1, wherein the roller covered with the metal sleeve includes an elastic roll, and the metal sleeve is pressed against the rotary support member by the elastic roll.

4. The method of claim 3, wherein the elastic roll is constituted of an inner metal cylinder rotatably supported and provided with rubber on a surface thereof.

5. The method of claim 1, wherein the metal, outer cylinder includes a space therein and is mounted on a pair of flanges which are disposed on an axis of rotation.

6. The method of claim 5, wherein a passage of fluid is provided in the space.

7. The method of claim 1, wherein the force F, with which the rotary pinch member is energized to the rotary support member divided by the width W of the film at the nip portion is not less than 5 kN/m and not more than 10 kN/m.

8. A method for manufacturing a cellulose film, the method comprising the steps of:
extruding a film of melted material including cellulose resin, in a sheet-like shape, through a flow casting die having a slot therein through which the melted material is extruded, wherein a gap of the slot is narrower at each edge position within 30 mm from an end of the film across a width of the film;
wherein the slot of the casting die is made of a pair of lips having a surface accuracy of 0.5 S or less;
supporting the film of melted material extruded from the flow casting die, in order of extrusion, on a surface of a rotary support member while rotating the rotary support member; and
forming the cellulose film out of the film of melted material by pinching the film of melted material at a nip portion which is formed between the rotary support member and a rotary pinch member energized thereto,
wherein a force F, with which the rotary pinch member is energized to the rotary support member, divided by a width W of the film of melted material, at the nip portion is not less than 1 kN/m and not more than 15 kN/m, the rotary pinch member includes a roller covered with a flexible metal sleeve whose thickness is not less than 0.1 mm and not more then 1.5 mm with a space sandwiched between the roller and the flexible metal sleeve a roll provided with a metal outer cylinder whose thickness is not less than 0.008 times and not more than 0.05 times of a radius of the roll, the metal sleeve or the metal outer cylinder is energized to the rotary support member, and the rotary pinch member pinches the film of melted material when a temperature T of the film of melted material just before being pinched by the nip portion and a glass transition temperature Tg of the cellulose resin satisfy the following relationship:

Tg<T<Tg110° C.; and wherein the following relationship is satisfied:

d1<d2 where:
d1 is an average thickness of the cellulose film at each edge position at the end of the cellulose film across the width of the cellulose film; and d2 is an average thickness of an inner part of the cellulose film which is between the edge positions.

9. A method for manufacturing a cellulose film, the method comprising the steps of:
extruding a film of melted material including cellulose resin, in a sheet-like shape, through a flow casting die having a st therein through which the melted material is extruded, wherein a gap of the slot is narrower at each edge position within 30 mm from an end of the film across a width of the film;
wherein the slot of the casting die is made of a pair of lips and one of the pair of lips is a flexible lip and the other of the pair of lips is a stationary lip and the pair of lips have a surface accuracy of 0.5 S or less;
supporting the film of melted material extruded from the flow casting die, in order of extrusion, on a surface of a rotary support member while rotating the rotary support member; and
forming the cellulose film out of the film of melted material by pinching the film of melted material at a nip portion which is formed between the rotary support member and a rotary pinch member energized thereto,
wherein a force F, with which the rotary pinch member is energized to the rotary support member, divided by a width W of the film of melted material at the nip portion is not less than 1 kN/m and not more than 15 N/m, the rotary pinch member includes a roller covered with a flexible metal sleeve whose thickness is not less than 0.1 mm and not more than 1.5 mm with a space sandwiched between the roller and the flexible metal sleeve or a roll provided with a metal outer cylinder whose thickness is not less than 0.008 times and not more than 0.05 times of a radius of the roll, the metal sleeve, or the metal outer cylinder is energized to the rotary support member, and the rotary pinch member pinches the film of melted material when a temperature T of the film of melted material just before being pinched by the nip portion and a glass transition temperature Tg of the cellulose resin satisfy the following relationship:

Tg<T<Tg+110° C.

10. A method for manufacturing a cellulose film, the method comprising the steps of
extruding a film of melted material including cellulose resin, in a sheet-like shape, through a flow casting die having a slot therein through which the melted material is extruded, wherein a gap of the to is narrower at each edge position within 30 mm from an end of the film across a width of the film;
wherein the casting die is made of a material selected from the group consisting of hard chromium, chromium carbide, chromium nitride, titanium carbide, titanium carbonitride, titanium nitride, cemented carbide, ceramics, tungsten carbide, aluminum oxide, and chromium oxide;
supporting the film of melted material extruded from the flow casting die, in order of extrusion, on a surface of rotary support member while rotating the rotary support member; and
forming the cellulose film out of the film of melted material by pinching the film of melted material, at a nip portion which is formed between the rotary support member and a rotary pinch member energized thereto,
wherein a force F, with which the rotary pinch member is energized to the rotary support member, divided by a width W of the film of melted material at the nip portion is not less than 1 kN/m and not more than 15 kN/m, the rotary pinch member includes a roller covered with a flexible metal sleeve whose thickness is not less than 0.1 mm and not more than 1.5 mm with a space sandwiched between the roller and the flexible metal sleeve or a roll provided with a metal outer cylinder whose thickness is not less than 0.008 times and not more than 0.05 times of a radius of the roll, the metal sleeve or the metal outer cylinder is energized to the rotary support member, and the rotary pinch member pinches the film of melted material when a temperature T of the film of melted material just before being pinched by the nip portion and a glass transition temperature Tg of the cellulose resin satisfy the following relationship:

$Tg < T < Tg + 110° C.$

* * * * *